(12) United States Patent
Philippot et al.

(10) Patent No.: US 12,460,282 B2
(45) Date of Patent: *Nov. 4, 2025

(54) CRACK-CONTAINING HOT-STAMPED COATED STEEL PART WITH EXCELLENT SPOT-WELDABILITY AND EXCELLENT PAINTING ADHESION

(71) Applicant: ArcelorMittal, Luxembourg (LU)

(72) Inventors: Clément Philippot, Ennery (FR); Doriane Serra, Talange (FR); Hubert Salmon Legagneur, Paris (FR); David Dussaussois, Homecourt (FR)

(73) Assignee: ArcelorMittal, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 18/757,440

(22) PCT Filed: Feb. 9, 2024

(86) PCT No.: PCT/IB2024/051221
§ 371 (c)(1),
(2) Date: Jun. 27, 2024

(87) PCT Pub. No.: WO2024/134632
PCT Pub. Date: Jun. 27, 2024

(65) Prior Publication Data
US 2025/0114837 A1    Apr. 10, 2025

(30) Foreign Application Priority Data
Jun. 30, 2023   (WO) .................. PCT/IB2023/056827

(51) Int. Cl.
*C22C 38/04*    (2006.01)
*B21D 22/02*    (2006.01)
(Continued)

(52) U.S. Cl.
CPC ............ *C22C 38/04* (2013.01); *B21D 22/022* (2013.01); *C21D 6/005* (2013.01); *C21D 8/0205* (2013.01);
(Continued)

(58) Field of Classification Search
None
See application file for complete search history.

(56) References Cited

U.S. PATENT DOCUMENTS

| | | |
|---|---|---|
| 10,590,507 B2 | 3/2020 | Drillet et al. |
| 2018/0223386 A1 | 8/2018 | Machado Amorim et al. |

(Continued)

FOREIGN PATENT DOCUMENTS

| | | |
|---|---|---|
| CN | 109982839 A | 7/2019 |
| CN | 110892087 A | 3/2020 |

(Continued)

OTHER PUBLICATIONS

International Search Report Corresponding to PCT/IB2023/056827.
International Search Report Corresponding to PCT/IB2024/051221.

*Primary Examiner* — Anthony M Liang
(74) *Attorney, Agent, or Firm* — Davidson Kappel LLC

(57) ABSTRACT

A hot-stamped coated steel part includes a steel substrate and an aluminum alloy coating comprising, proceeding from steel substrate outwards, an interdiffusion layer and an outer layer. The total thickness of the coating $e_{coating}$ and the thickness of the interdiffusion layer $e_{IDL}$ satisfy the following condition:

$$40 \leq E_{pc} \leq 80$$

with (Continued)

-continued $$E_{pc} = \sqrt{\left(\frac{33.3 - e_{IDL}}{0.9} + e_{IDL} - e_{coating}\right)^2 - 148(e_{IDL} - e_{coating})} - \left(\frac{33.3 - e_{IDL}}{0.9} + e_{IDL} - e_{coating}\right)$$

The hot-stamped coated steel part comprises an undeformed portion having a thickness $e_{Pflat}$ from 0.6 mm to 3.5 mm, and at least one deformed portion. A lineic density of cracks dC in the coating in the undeformed portion is higher than or equal to a minimum lineic density of cracks $dC_{min}(e_{Pflat})$ defined as:

$$dC_{min}(e_{pflat}) = 15.5 + 91 * e^{-7.44 - 2.88 * arctan\left(5.49 * \left(e_{pflat} - 1.71\right)\right)} - 106.5 * e^{-8.62 - 3.34 * arctan\left(5.49 * \left(e_{pflat} - 1.71\right)\right)}$$

12 Claims, 3 Drawing Sheets

(51) Int. Cl.
| | |
|---|---|
| C21D 6/00 | (2006.01) |
| C21D 8/02 | (2006.01) |
| C22C 21/02 | (2006.01) |
| C22C 38/00 | (2006.01) |
| C22C 38/02 | (2006.01) |
| C22C 38/14 | (2006.01) |
| C23C 2/12 | (2006.01) |

(52) U.S. Cl.
CPC ......... *C21D 8/0226* (2013.01); *C21D 8/0273* (2013.01); *C21D 8/0278* (2013.01); *C22C 21/02* (2013.01); *C22C 38/002* (2013.01); *C22C 38/02* (2013.01); *C22C 38/14* (2013.01); *C23C 2/12* (2013.01); *C21D 2211/001* (2013.01); *C21D 2211/002* (2013.01); *C21D 2211/005* (2013.01); *C21D 2211/008* (2013.01)

(56) References Cited

U.S. PATENT DOCUMENTS

| | | |
|---|---|---|
| 2020/0224297 A1 | 7/2020 | Henrion et al. |
| 2022/0025480 A1 | 1/2022 | Remy et al. |
| 2022/0380863 A1 | 12/2022 | Grigorieva et al. |
| 2023/0272502 A1 | 8/2023 | Pipard et al. |
| 2024/0384380 A1 | 11/2024 | Gerber et al. |

FOREIGN PATENT DOCUMENTS

| | | |
|---|---|---|
| CN | 112789358 A | 5/2021 |
| CN | 112955572 A | 6/2021 |
| EP | 3623493 A1 | 3/2020 |
| EP | 3933061 A1 | 1/2022 |
| FR | 2780984 A1 | 1/2000 |
| FR | 2807447 | 10/2001 |
| WO | WO2008053273 A1 | 5/2008 |
| WO | WO2014134632 A2 | 9/2014 |
| WO | WO2018234102 A1 | 12/2018 |
| WO | WO2023020931 A1 | 2/2023 |

CRACK-CONTAINING HOT-STAMPED COATED STEEL PART WITH EXCELLENT SPOT-WELDABILITY AND EXCELLENT PAINTING ADHESION

This is a continuation of International Patent Application PCT/IB2024/051221, filed on Feb. 9, 2024 which claims priority to International Patent Application PCT/IB2023/056827, filed on Jun. 30, 2023, both of which applications are hereby incorporated by reference herein.

The present disclosure concerns a hot-stamped coated steel part comprising a steel substrate and an aluminum alloy coating on at least one face of the steel substrate, the coating comprising an optimized crack density, the part having an excellent painting adhesion and an excellent spot weldability. The present disclosure also relates to a method for manufacturing a hot-stamped coated steel part.

Such parts can also be used for example in the automobile industry, for the fabrication of structural elements for anti-intrusion or energy absorption functions.

BACKGROUND

In such type of applications, it is desirable to have steel parts that combine high mechanical strength, high impact resistance, good corrosion resistance and dimensional accuracy. Automotive parts such as front or rear rails, roof rails, B-pillars, and chassis parts such as lower control arms, engine cradles, need more particularly these properties.

To meet these demands, such parts are now generally produced by hot stamping process (also named press-hardening). In hot-stamping process, as disclosed in particular in FR 2 780 984 and FR 2 807 447, a blank cut from a steel sheet, pre-coated with a metal or metal alloy, is heated in a furnace to a temperature at which the ferrite and cementite microstructure of a low carbon steel is at least partly transformed into austenite and then hot stamped in a die. During stamping, the part is held in the die to achieve a rapid cooling, leading to the formation of the desired hardened microstructure and the obtention of the desired mechanical properties. The pre-coating can be aluminum or an aluminum alloy. During the heating in the furnace, the pre-coating alloys with the steel substrate to form a compound that provides protection of the surface of the steel against decarburization and the formation of scale.

Recently, the focus was made on the coating of the part, after hot-stamping, and how it affects the properties of the parts in use.

In WO 2008/053273A1, it was proposed to restrict the pre-coating thickness to between 20 and 33 µm at every location, and to control the hot stamping process, especially the heating rate and the austenitization parameters, in order to achieve a favorable succession and morphology of continuous layers in the coating of the part, leading to an improved weldability.

SUMMARY

However, it remains desirable to provide a hot-stamped steel part having a further improved spot weldability and an improved painting adhesion, which can be produced with a broadened range of pre-coating thickness.

Especially, the inventors found that, even if painting adhesion can be improved in some cases, this improvement is achieved to the detriment of the spot weldability so that it remains desirable to provide a part combining an excellent painting adhesion and an excellent spot weldability.

Therefore, the present disclosure aims at providing a hot-stamped coated steel part comprising a steel substrate and an aluminum alloy coating on at least one face of the steel substrate having at the same time an excellent painting adhesion and an excellent spot weldability, and a method for manufacturing the same.

In particular, it is desired to provide a hot-stamped coated steel part having at least an undeformed portion with a welding range, as measured according to the standard SEP 1220-2 (2011), of more than 1 kA, together with an excellent painting adhesion. The painting adhesion is assessed by performing a dry painting test and a wet painting adhesion test according to the standard ISO 2409:2013. The painting adhesion is considered as excellent if the result of the dry painting test is strictly lower than 1 and the result of the wet painting adhesion test is lower than or equal to 1.

For this purpose, the present disclosure provides A hot-stamped coated steel part comprising a steel substrate and an aluminum alloy coating on at least one face of the steel substrate, the coating comprising, proceeding from steel substrate outwards, an interdiffusion layer and an outer layer, wherein the total thickness of the coating $e_{coating}$ and the thickness of the interdiffusion layer $e_{IDL}$ satisfy the following condition:

$$40 \leq E_{pc} \leq 80$$

with $$E_{pc} = \sqrt{\left(\frac{33.3 - e_{IDL}}{0.9} + e_{IDL} - e_{coating}\right)^2 - 148(e_{IDL} - e_{coating})} - \left(\frac{33.3 - e_{IDL}}{0.9} + e_{IDL} - e_{coating}\right)$$

$e_{IDL}$ designating the thickness of the interdiffusion layer in µm, and $e_{coating}$ designating the total thickness of the coating in µm, and wherein, the hot-stamped coated steel part comprising an undeformed portion having a thickness $e_{Pflat}$ from 0.6 mm to 3.5 mm, and at least one deformed portion, a lineic density of cracks dC in the coating in the undeformed portion is higher than or equal to a minimum lineic density of cracks $dC_{min}(e_{Pflat})$ defined as:

$$dC_{min}(e_{pflat}) = 15.5 + 91 * e^{-7.44 - 2.88 * arctan(5.49 * (e_{pflat} - 1.71))} - 106.5 * e^{-8.62 - 3.34 * arctan(5.49 * (e_{pflat} - 1.71))}$$

wherein dC and $dC_{min}(e_{Pflat})$ are expressed in numbers of cracks per mm, and $e_{pflat}$ designates the thickness of the undeformed portion in mm.

The present disclosure also provides to a method for producing a hot-stamped coated steel part, comprising the successive steps of:

providing a steel blank having an average thickness $e_B$ from 0.6 mm to 3.5 mm, the steel blank comprising, on at least one face, an aluminum or aluminum alloy pre-coating, the pre-coating having an average thickness comprised between 19.91 µm and 40 µm, heating the steel blank in a furnace to a heating temperature $T_{heat}$ comprised between 850° C. and 970° C. and holding the steel blank at the heating temperature $T_{heat}$ in order to get a fully austenitic structure in the steel of the blank, transferring the heated blank to a die, then closing the die, hot-stamping the blank in the die, such that a flat portion of the blank having a thickness $e_{Bflat}$ from 0.6 mm to 3.5 mm is not subjected to a deformation, and at least one portion is deformed of the blank through hot-stamping, to thereby obtain a hot-stamped blank comprising an undeformed portion and at least one deformed portion, cooling the hot-stamped blank to a temperature less than 400° C. to obtain a hot-stamped coated steel part, wherein the temperature $T_{close}$ of the blank when the die is closed is comprised between 720° C. and 820° C., and the time $t_M$ spent by the blank above the melting temperature $T_{melt}$ of the pre-coating upon heating, holding, transfer and hot-stamping, is comprised between a minimum time $t_{Mmin}$ and a maximum time $t_{Mmax}$, wherein:

$$t_{Mmin}(e_{Bflat}) = \frac{10.7 * e_{Bflat} + 4.8}{\left(\frac{T_{heat} - Tmelt}{1000}\right)^2}$$

and $t_{Mmax}(e_{Bflat}) = \dfrac{4.96 + 0.444 * e_{Bflat} + 2.71 * \arctan(9.52 * (e_{Bflat} - 1.71))}{\left(\dfrac{T_{heat} - T_{melt}}{1000}\right)^5}$ in which $t_{Mmin}$ and $t_{Mmax}$ are expressed in seconds, $T_{heat}$ designates the heating temperature of the blank in ° C., $T_{melt}$ designates the melting temperature of the pre-coating in ° C. and $e_{Bflat}$ designates the thickness of the portion of the blank not subjected to a deformation, in mm.

The present disclosure also relates to the use of a hot-stamped coated steel part according to the present disclosure or produced by a method according to the present disclosure for the manufacture of chassis or body-in-white parts or suspension arms for automobile vehicles.

BRIEF SUMMARY OF THE DRAWINGS

The present disclosure will now be described in detail and illustrated by examples without introducing limitations, in view of the following figures, wherein.

DETAILED DESCRIPTION

Figure 1:
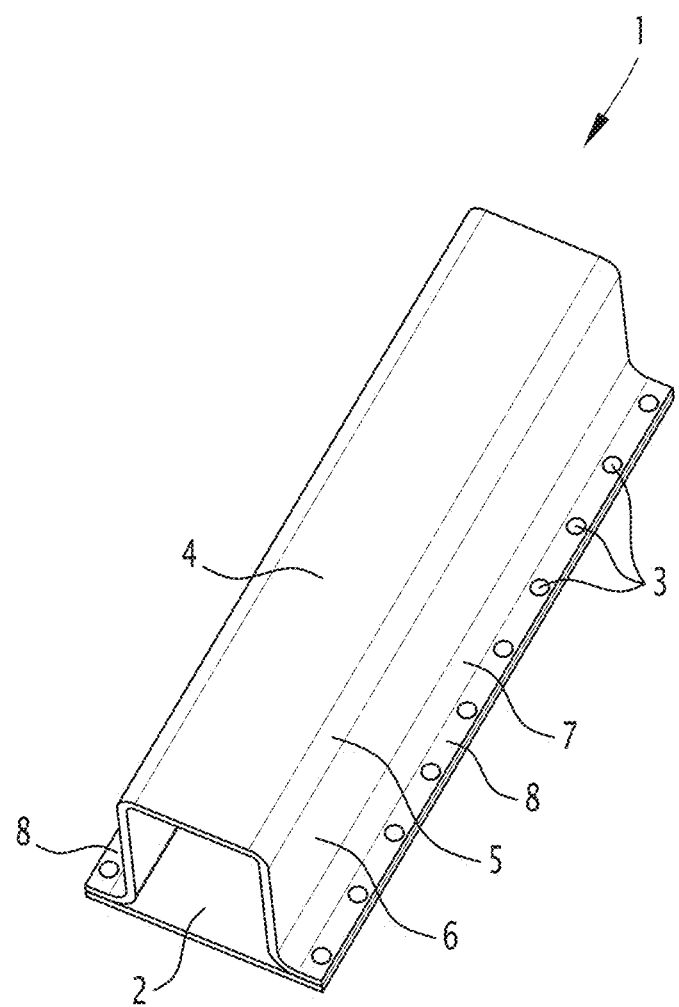
FIG. 1 illustrated schematically an example of hot-stamped coated steel part according to the present disclosure.

The present disclosure relates to a hot-stamped coated steel part.

A hot-stamped coated steel part is a non-planar part produced by hot-stamping a blank.

A steel sheet refers to a flat sheet of steel. A steel sheet here designates a hot-rolled steel sheet or a cold-rolled steel sheet in the form of a coil, or cut from such a coil.

A steel sheet has a top and bottom face, which are also referred to as a top and bottom sides or as a top and bottom faces or surfaces. The distance between said faces is designated as the thickness of the sheet. The thickness can be measured for example using a micrometer, the spindle and anvil of which are placed on the top and bottom faces, the axis between the spindle and the anvil being normal to the surface of the sheet. In a similar way, the thickness can also be measured on a formed part. In a similar way, the thickness can also be measured on a blank and on a part.

A blank of steel refers to a flat sheet of steel, which has been cut to any shape suitable for its use, or a blank produced by cutting two or more steel sheets materials which may have different thicknesses or different compositions into a required shape and assembled together, in particular welded together.

By average thickness of a part, or of a portion of a part, it is meant the overall average thickness of the material making up the part after it has been formed into a 3-dimensional part from an initially flat sheet.

By uniform thickness, it is meant that the thickness of the considered blank, part, sheet, or region or portion thereof, is constant, a maximum variation of the thickness in the blank, part, sheet or region or portion thereof, above or below the average thickness of the blank, part, sheet or region or portion, being of at most 0.1 mm. In particular, a uniform thickness implies that no variation in thickness was voluntarily introduced during production, especially during the production of the sheet in hot and/or cold-rolling, and during the forming operations of the production of the part.

In the following, the thickness of a blank, part, sheet, or region or portion thereof with a uniform thickness is defined as the average thickness of this blank, part, sheet, or region or portion thereof.

Besides, the term "thickness" is used to designate the thickness of a blank, part, sheet, or region or portion thereof of a uniform thickness, whereas "average thickness" is used more generally to designate the average thickness of a blank, part, sheet, or region or portion thereof, irrespective of whether the thickness is uniform or variable.

Tailor welded blanks are made by assembling together, for example by laser welding, several sheets or cut-out blanks of steel, known as sub-blanks, in order to optimize the performance of the part in its different areas, to reduce overall part weight, to reduce overall part cost and to reduce material scrap. The sub-blanks forming the tailor welded blanks can be assembled with or without overlap, for example they can be laser butt-welded (no overlap), or they can be spot-welded to one another (with overlap).

A flexible blank is a type of tailor welded blank including regions wherein at least part of the connection between the different sub-blanks is not rigid, allowing the sub-blanks to move in different directions during the forming operation in the corresponding regions.

By opposition to a tailor welded blank, a monolithic blank refers to a blank which consists of one single sub-blank, without several sub-blanks being combined together.

A tailor rolled blank is a blank having a varying thickness, i.e. variation of thickness along the blank, obtained by differential rolling during the steel sheet production process.

Hot stamping is a forming technology which involves heating a blank up to a temperature at which the microstructure of the steel has at least partially transformed to austenite, forming the blank at high temperature by stamping it and quenching the formed part to obtain a microstructure having a high strength. Hot stamping allows obtaining very high strength parts with complex shapes and presents many technical advantages.

A monolithic part is a hot-stamped part produced from a monolithic blank.

A monolithic part is for example produced from a monolithic blank with a uniform thickness, or from a monolithic tailor rolled blank.

A hot-stamped welded steel part, or hot-stamped laser welded steel part, is a hot-stamped part produced from a tailor welded blank, for example from a flexible blank. A hot-stamped welded steel part thus comprises two or more hot-stamped sub-parts and one or more hot-stamped weld(s) joining together the hot-stamped sub-parts.

In an embodiment, the hot-stamped coated steel part of the present disclosure is a monolithic part.

In another embodiment, the hot-stamped coated steel part is a hot-stamped welded steel part.

The hot-stamped coated steel part of the present disclosure preferably has an average thickness $e_P$ comprised between 0.6 mm and 3.5 mm.

The range of 0.6 mm to 3.5 mm is the usual thickness used in the fabrication of structural or reinforcing parts for the automotive industry. This thickness range is also suited to industrial press hardening tools, in particular hot stamping presses or dies.

Additionally, as detailed below, the thermal process applied to a given steel sheet thickness has an effect on the coating, in particular on the formation of the cracks in the coating of the flat undeformed portion which are desired in the present disclosure.

Preferably, the average thickness $e_P$ of the hot-stamped coated steel part is within the range of 0.7 mm to 3.0 mm.

In an embodiment, the hot-stamped coated steel part has a uniform thickness $e_P$ from 0.6 mm to 3.5 mm, preferably from 0.7 mm to 3.0 mm.

In another embodiment, the hot-stamped coated steel part has a variable thickness (thus non-uniform). In that case, the hot-stamped coated steel part consists of two or more regions with different uniform thicknesses $e_P$ which are preferably each from 0.6 mm to 3.5 mm, preferably from 0.7 mm to 3.0 mm.

As an example, a hot-stamped coated steel part with a variable thickness can be produced from a tailor rolled blank having a varying thickness obtained by differential rolling during the steel sheet production process.

As another example, a hot-stamped coated steel part with a variable thickness can be a hot-stamped welded steel part produced from a tailor welded blank made of blanks with different thicknesses.

The hot-stamped coated steel part comprises a steel substrate (also named steel base) having two main faces.

The steel in the substrate is a steel for hot-stamping, i.e. a steel capable of hardening after austenitization and rapid cooling by quenching.

In an embodiment, the part being produced from a monolithic blank, the steel substrate is made of a single steel.

In another embodiment, the part being a hot-stamped welded steel part, the steel substrate consists of two or more areas (or sub-parts) which can be made of the same steel or different steels, and may have the same or different microstructures.

In the following, by microstructure and composition of the steel of the steel substrate, it is meant the microstructure and the composition of the steel substrate (if the substrate is made of a single steel) or the microstructure or composition in one or more of the areas or sub-parts of the steel substrate.

The composition of the steel depends on the desired mechanical properties for the part. But preferably, in the steel substrate or in each area of the steel substrate, the steel has a composition comprising, by weight %:

$0.062\% \leq C \leq 0.4\%$ $0.4\% \leq Mn \leq 3.9\%$ $0.10\% \leq Si \leq 1.5\%$ $0.005\% \leq Al \leq 1.0\%$ $0.001\% \leq Cr \leq 2.0\%$ $0.001\% \leq Ti \leq 0.2\%$ $0.0005\% \leq B \leq 0.010\%$ $Ni \leq 2\%$ $Nb \leq 0.1\%$ $Mo \leq 0.65\%$ $W \leq 0.30\%$ $N \leq 0.010\%$ $0.0001\% \leq S \leq 0.05\%$ $0.0001\% \leq P \leq 0.1\%$ $Ca \leq 0.005\%$ the balance of the composition consisting of iron and unavoidable impurities resulting from elaboration.

The level of impurities resulting from the elaboration process will depend on the production route used. For example, when using a Blast Furnace route with a low level of steel scrap (recycled steel), the level of impurities will remain very low. On the other hand, when elaborating the steel using an electric furnace, with a very high ratio of recycled scrap steel, the level of impurities will be significantly increased. In this latter case, for example, the level of Cu can go up to 0.25%, Ni can go up to 0.25%, Sn can go up to 0.05%, As can go up to 0.03%, Sb can go up to 0.03% and Pb can go up to 0.03%.

Hence, in an embodiment, the steel comprises up to 0.25% Cu, up to 0.05% Sn, up to 0.03% As, up to 0.03% Sb and/or up to 0.03% Pb as unavoidable impurities.

The above composition is favorable to the achievement of high mechanical properties, in particular a tensile strength TS in the range of 950 MPa to 2100 MPa.

The tensile strength is measured according to ISO standard NF EN ISO 6892-1, published in October 2009. The tensile test specimens are cut-out from flat portions of the hot stamped part.

In what follows, the contents in the elements are expressed by weight percent, unless otherwise explicated.

The carbon content depends on the desired tensile strength TS of the hot-stamped coated steel part.

Below a content of 0.062% of C, it is difficult to obtain a tensile strength of at least 950 MPa after hot-stamping under any cooling conditions. Above 0.4%, in combination with the other elements of the composition, the adhesion of the coating after hot stamping may not be satisfactory, and the resistance to delayed cracking and the toughness of the steel decrease. In an embodiment, the C content is of at most 0.38%.

The C content depends on the desired tensile strength TS of the hot-stamped part, produced by hot-stamping the steel sheet. In an embodiment, the C content is comprised between 0.062% and 0.095%. If a higher tensile strength is desired, in the order of 1500 MPa, the C content can be increased to the range of 0.15% to 0.30%. If a further increase of the tensile strength, to at least 1800 MPa is needed, the C content can be added in a content of up to 0.4%.

Apart from its deoxidizing role, manganese has an important effect on quenchability, in particular when its content is of at least 0.4%. Above 3.9%, the stabilization of austenite by Mn may be too important, which may leads to the formation of a too pronounced banded structure. Preferably, the Mn content is of at most 3.0%.

Silicon is added in a content of at least 0.10% to help deoxidizing the liquid steel and to contribute to the hardening of the steel by precipitating in solid solution. Its content is however generally limited in order to avoid excess formation of silicon oxides impairing the coatability of the steel. The silicon content is therefore generally lower than or equal to 1.5%, for example lower than or equal to 0.80%.

Aluminum may be added as a deoxidizer, in a content of at least 0.005%. Additionally, Al can protect boron by binding with N is the titanium content is insufficient. The Al content is preferably of at least 0.01%. The Al content is generally lower than or equal to 1.0% to avoid oxidation issues and avoid the formation of ferrite during hot-stamping. Preferably, the Al content is of at most 0.1%.

Cr may be added to increase the quenchability of the steel and to contribute to achieving the desired tensile strength after hot-stamping. When Cr is added, its content is higher than or equal to 0.01%, preferably higher than or equal to 0.1%, up to 2.0%. If no voluntary addition of Cr is performed, the Cr content may be present as an impurity in a content as low as 0.001%.

When titanium is added, its content is preferably of at least 0.008%, up to 0.2%. When the Ti content is comprised between 0.008% and 0.2%, precipitation at very high temperature occurs in the form of TiN and then, at lower temperature, in the austenite in the form of fine TiC, resulting in hardening. Furthermore, when titanium is added in addition to boron, titanium prevents combination of boron with nitrogen, the nitrogen being combined with titanium. Hence, the titanium content is preferably higher than 3.42*N, N being the N content by weight percent in the composition. However, the Ti content should preferably remain lower than or equal to 0.2%, preferably lower than or equal to 0.1%, still preferably of at most 0.05%, to avoid precipitation of coarse TiN precipitates. If no voluntary addition of Ti is performed, Ti is present as an impurity in a content of at least 0.001%.

Boron is added in a content of at least 0.0005%, up to 0.010%, to increase the quenchability of the steel. Preferably, the B content is of at most 0.004%.

In an embodiment, Ni may be added in a content of at most 2% and generally at least 0.25% and preferably up to 0.5% to reduce susceptibility to delayed fracture by concentrating on the surface of the part. If not added, Ni may be present as an impurity in a content which may be as low as 0.001%. Depending on the production route used, the Ni content as an impurity can be as high as 0.25% (e.g. when producing the steel with a high ratio of recycled scrap steel) or as high as 0.1% (e.g. when using a lower level of steel scrap).

Up to 0.1% of niobium is optionally added to provide precipitation hardening and microstructure refinement such as the prior austenitic grain size. Nb further improves the ductility of the steel. When Nb is added, its content is preferably of at least 0.01%. The Nb content is preferably of at most 0.06% to avoid the formation of coarse (Ti,Nb)(C,N) precipitates.

Molybdenum may be added in a content of at most 0.65%. When Mo is added, its content is preferably of at least 0.05%. Mo is preferably added together with Nb and Ti, to form co-precipitates which are very stable at high temperatures. Mo may also be added to increase the toughness of the steel playing a role grain boundary strengthener in solid solution state. An optimal effect is obtained when the Mo content is comprised between 0.15% and 0.25%.

W may be added to increase the quenchability and the hardenability of the steel by forming tungsten carbides. When W is added, its content is higher than or equal to 0.001%, and lower than or equal to 0.30%.

Sulfur, phosphorus and nitrogen and generally present in the steel composition as impurities.

The nitrogen content is generally of at least 0.0005%. The N content is generally of at most 0.010%, preferably of at most 0.005%, to prevent precipitation of coarse TiN precipitates.

When in excessive amounts, sulfur and phosphorus reduce the ductility. Therefore, their contents are limited to 0.05% and 0.1% respectively.

In particular, the presence of S in the liquid steel can lead to the formation of MnS precipitates which are detrimental to the properties. Preferably, the S content is of at most 0.01%, better of at most 0.005%. Achieving a very low S content, i.e. lower than 0.0001%, is very costly, and without any benefit. Therefore, the S content is generally higher than or equal to 0.0001%.

Preferably, the phosphorus content is of at most 0.05%, still preferably of at most 0.02%. Achieving a very low P content, i.e. lower than 0.0001%, is very costly. Therefore, the P content is generally higher than or equal to 0.0001%.

The steel may undergo a treatment for globularization of sulfides performed with calcium, which has the effect of improving the bending angle, due to MnS globularization. Hence, the steel composition may comprise at least 0.0001% of Ca, up to 0.005%.

The remainder of the composition of the steel is iron and impurities resulting from the elaboration process. As detailed above, the impurities resulting from the elaboration process may include 0.25% or less of Cu, 0.05% or less of Sn, 0.03% or less of As, 0.03% or less of Sb and/or 0.03% or less of Pb.

The composition of the steel may be selected depending on the desired mechanical properties, in particular in terms of strength and ductility.

In particular, when a tensile strength in the range of 950 to 1200 MPa is desired, together with a bending angle higher than 75° (measured according to the VDA 238-100 bending standard of July 2020), in the whole part or in at least one area of the part, the steel of the steel substrate or in the at least one area of the steel substrate preferably has a composition in accordance with a first preferred composition, comprising, by weight %:

$0.062\% \leq C \leq 0.095\%$ $1.4\% \leq Mn \leq 1.9\%$ $0.2\% \leq Si \leq 0.5\%$ $0.020\% \leq Al \leq 0.070\%$ $0.02\% \leq Cr \leq 0.1\%$ With $1.5\% \leq (C+Mn+Si+Cr) \leq 2.7\%$ $0.0035\% \leq Ti \leq 0.072\%$ $0.0002\% \leq B \leq 0.004\%$ $0.04\% \leq Nb \leq 0.06\%$ with 0.044% ≤ (Nb+Ti) ≤ 0.09%

0.001% ≤ N ≤ 0.009%

0.0005% ≤ S ≤ 0.003%

0.0001% ≤ P ≤ 0.020%

Ca ≤ 0.005%, the balance of the composition consisting of iron and unavoidable impurities resulting from elaboration.

On the other hand, when a tensile strength of at least 1400 MPa, is required, the steel of the steel substrate or in at least one area of the steel substrate preferably has a composition in accordance with a second preferred composition comprising, by weight %:

0.15% ≤ C ≤ 0.30%

0.5% ≤ Mn ≤ 3.0%

0.10% ≤ Si ≤ 0.50%

0.005% ≤ Al ≤ 0.1%

0.01% ≤ Cr ≤ 1.0%

0.001% ≤ Ti ≤ 0.2%

0.0002% ≤ B ≤ 0.010%

0.0005% ≤ N ≤ 0.010%

0.0001% ≤ S ≤ 0.05%

0.0001% ≤ P ≤ 0.1%

Ca ≤ 0.005% the remainder being Fe and unavoidable impurities resulting from elaboration.

If an even higher tensile strength is required, of 1800 MPa or higher, the composition of the steel substrate or in at least one area of the steel substrate is preferably according to a third preferred composition, comprising, by weight %:

0.3% ≤ C ≤ 0.4%

0.5% ≤ Mn ≤ 1.0%

0.40% ≤ Si ≤ 0.80%

0.01% ≤ Al ≤ 0.1%

0.1% ≤ Cr ≤ 1.0%

0.008% ≤ Ti ≤ 0.03%

0.0005% ≤ B ≤ 0.003%

Ni ≤ 0.5%

0.01% ≤ Nb ≤ 0.1%

0.1% ≤ Mo ≤ 0.5%

N ≤ 0.005%

0.0001% ≤ S ≤ 0.004%

0.0001% ≤ P ≤ 0.02%

Ca ≤ 0.0010% the balance of the composition consisting of iron and unavoidable impurities resulting from elaboration.

The steel substrate of the hot-stamped coated steel part generally has a microstructure consisting of, in volume fraction, at least 60% martensite, at most 20% bainite and at most 5% ferrite and at most 15% austenite.

The martensite fraction can be as high as 100%, and the bainite, ferrite and austenite fractions each as low as 0%.

This microstructure description applies to the majority of the steel substrate, which means that this microstructure is present in at least 95% of the volume of the steel substrate, preferably in the whole volume of the steel substrate.

The microstructure is determined through the following method: a specimen is cut from the hot-stamped coated steel part, polished as detailed below, and etched with Nital 2% (10 s), to reveal the microstructure. The section is afterwards examined through optical microscope with a 500× magnification and, if it is required to distinguish martensite from bainite, with a Scanning Electron Microscope (SEM) (Back Scattered Electron mode, Magnification 500×, EHT (Electron High Tension Voltage)=15.00 kV, Scale 10 micrometers). The determination of the volume fraction of each constituent (martensite, bainite, ferrite, austenite) is performed with image analysis through a method known per se.

In an embodiment, the austenite fraction is of at most 5% by volume and/or the bainite fraction is of at most 10% by volume.

In an embodiment, the microstructure consists of, by volume, at least 80% martensite, up to 10% of bainite, up to 5% austenite and up to 5% ferrite.

In a preferred embodiment, the microstructure is essentially martensitic, i.e. consists of, by volume, at least 95% martensite and up to 5% of bainite and/or ferrite.

Still preferably, the microstructure is fully martensitic.

The hot-stamped coated steel part comprises an undeformed portion and at least one deformed portion.

In an embodiment, the hot-stamped coated steel part comprises two or more undeformed portions.

Indeed, upon stamping to produce the part, in particular hot-stamping, one or more portions of the blank is not deformed, whereas other portions are deformed to arrive at the final non-planar geometry of the part. The or each undeformed portion is a portion which has not been subjected to a deformation during hot-stamping, nor, if performed, during a previous cold predeformation of the blank.

By undeformed, it has to be understood that during the stamping process, the undeformed portion was subjected to an equivalent deformation $\varepsilon_b$ of at most 0.01. The equivalent deformation is defined as $$\varepsilon_b = \frac{2}{\sqrt{3}}\sqrt{(\varepsilon_1^2 + \varepsilon_1\varepsilon_2 + \varepsilon_2^2)},$$

wherein $\varepsilon_1$ and $\varepsilon_2$ are the principal deformations.

For example, the principal deformations $\varepsilon_1$ and $\varepsilon_2$ of a given formed part can be determined in the following way, the procedure described below being one example of a method to determine the principal deformations and is in no way limiting—other methods also exist:

A numerical model of the physical part is acquired using a 3D camera. The output of this first operation is a CAD file representing the physical part.

The CAD file is then processed by a reverse forming software, such as for example Pamstamp® Onestep, which computes the deformation field which was necessary to stamp the shape of the part starting from a flat blank.

Said deformation field is then expressed in corresponding principal deformations, using any of the commercial softwares listed above (for example Pamstamp®, Abaqus® or LS-Dyna®).

When the above-described method cannot be applied, for example because only a portion of the full formed part is available or in order to assess deformation very locally in specific areas such as for example on the edges, Electron Back Scattered Diffraction (EBSD) measurements in conjunction with Scanning Electron Microscope (SEM) observations can be done. It relies on the correlation, which exists between deformation and local crystal misorientation. The following reference for example gives an example of such measurement: "Kamaya M. Assessment of local deformation using EBSD: quantification of accuracy of measurement and definition of local gradient. Ultramicroscopy. 2011 July; 111(8):1189-99. doi: 10.1016/j.ultramic.2011.02.004. Epub 2011 Feb. 21. PMID: 21763236."

Another methodology that can be applied to determine the principal deformations on a formed part is to measure the thickness of the deformed material in a formed area and compare it with the thickness of an undeformed area.

The or each undeformed portion is a flat portion of the part.

The or each undeformed portion is for example a flange of the part or a flat portion located between two deformed portions of the part. As an example, the part being hat-shaped, the flat portions may further include a flat top portion of the hat-shaped stamped part.

An example of such a part is illustrated schematically on FIG. 1.

FIG. 1 shows a hot-stamped coated steel part 1 which has been welded to a flat part 2 by a plurality of spot welds 3. The spot welds 3 are located, in this example, at the flanges 8 of the hot-stamped coated steel part 1.

The exemplary hot-stamped coated steel part 1 is a hat-shaped part (or "omega" shaped part) comprising a flat top portion 4, two first curved portions 5 (or radius) extending from two opposite longitudinal edges of the flat top portion 4, two side walls 6 each extending from the longitudinal edge of a first curved portion 6, two second curved portions 7 each extending outwards from the longitudinal edge of a side wall 6, and two flat flanges 8 each extending from the longitudinal edge of a second curved portion 7 to an outside edge of the part 1. The flanges 8 therefore form the edges of the part 1.

In this example, the flanges 8 and the flat top portion 4 are flat undeformed portions of the hot-stamped coated steel part 1.

The undeformed portions can be distinguished from deformed portions in their shape, and/or by observing the cracks in the coating of these portions.

Indeed, as detailed below, the coating of a deformed portions contain wide cracks which are not or seldom present in the coating of an undeformed portion.

Each undeformed portion, though it was not subjected to a deformation, has been subjected to the same thermal cycle as the deformed portion(s).

The hot-stamped coated steel part of the present disclosure is distinct from a flat blank that would have been produced through austenitizing and quenching, without any deformation, not only in that it includes at least one deformed portion resulting from the hot-stamping, but also in that the whole hot-stamped coated steel part has been subjected to a thermal cycle, through hot-stamping, which is different from the thermal cycle experienced by undeformed sheets.

In particular, each undeformed portion, though it was not subjected to a deformation, has experienced the same thermal cycle as the deformed portion(s) in hot-stamping, during the heating, the transfer to the die and the holding in the die.

Thus, in the hot-stamped coated steel part, the or each deformed portion(s) was deformed during hot-stamping, and the or each undeformed portion(s), though not deformed, was subjected to the same thermal cycle as the deformed portion(s) during hot-stamping.

The hot-stamped coated steel part of the present disclosure, obtained with an in-die hot stamping process, is also distinct from a sample that would have been produced by heating in an experimental furnace or any surface contact free technique, e.g. in a Gleeble machine, and uniaxially deformed within this furnace. Indeed, such a sample does not have an undeformed portion, and was subjected to a uniaxial deformation (tensile deformation), whereas in hot-stamping the deformation is not uniform through the part, and three dimensional. Additionally, the thermal cycle experienced by the hot-stamped coated steel part is different from the thermal cycle experienced in an experimental furnace which does not involve any transfer nor stamping in a die.

The or each flat undeformed portion(s) of the part is a portion having a uniform thickness $e_{pflat}$ from 0.6 mm to 3.5 mm, preferably from 0.7 mm to 3.0 mm.

For example, if a flange consists of two regions with different thicknesses $e_{pflat(1)}$ and $e_{pflat(2)}$, each of these regions is a distinct undeformed portion.

If the hot-stamped coated steel part has a uniform thickness, the thickness of the flat undeformed portion (or each undeformed portion) equals the thickness $e_P$ of the hot-stamped coated steel part.

If the hot-stamped coated steel part has a variable thickness and comprises two or more undeformed portions, the thicknesses of the undeformed portions, noted $e_{Pflat(i)}$, with i=1 . . . n being an index associated to the respective undeformed portions, n being the number of undeformed portions, may differ from each other, or may be the same.

The thickness $e_{pflat}$ can be measured for example using a micrometer.

The hot-stamped coated steel part comprises, on a least face of the steel substrate, a coating.

The coating is an aluminum alloy coating.

This coating comprises aluminium and iron, and preferably further includes silicium.

The coating comprises advantageously over 50% aluminum.

For example, the coating contains 8-12 wt % of Si and 3-5 wt % of Fe, the balance being Al and unavoidable impurities.

The coating results from the interdiffusion between an aluminium alloy pre-coating and the steel during the hot-stamping.

The coating comprises an interdiffusion layer, which is located on the innermost side of the coating, that is, is in contact with the steel substrate.

The interdiffusion layer generally has a Fe content of at least 80%, up to 95%, and an Al content of 4% to 20%, with up to 2% Si.

In an embodiment, the interdiffusion layer has a composition consisting of 86-95% Fe, 4-12% Al and 0-2% Si.

The coating further comprises an outer layer extending from the diffusion layer to the surface of the coating.

The outer layer generally comprises or consists of intermetallic compounds of Fe, Al and possibly Si.

The outer layer may consist of a single layer or may itself be composed of sub-layers of different intermetallic compounds.

For example, the outer layer consists of one to four sub-layers.

However, in the present disclosure, the inventors found that whatever the layers in the coating, in particular whatever their composition and numbers, the aim of the present disclosure is achieved if the lineic density of cracks respects the condition defined below.

In the hot-stamped coated steel part according to the invention, the total thickness of the coating $e_{coating}$ and the thickness of the interdiffusion layer $e_{IDL}$ satisfy the following condition:

$$40 \leq E_{pc} \leq 80$$

with $$E_{pc} = \sqrt{\left(\frac{33.3 - e_{IDL}}{0.9} + e_{IDL} - e_{coating}\right)^2 - 148(e_{IDL} - e_{coating})} - \left(\frac{33.3 - e_{IDL}}{0.9} + e_{IDL} - e_{coating}\right)$$

If the value of $E_{pc}$ is lower than 40, the coating may not protect enough the part for the intended uses and the excellent painting adhesion and spot weldability may not be guaranteed. If the value of $E_{pc}$ is more than 80, the coating may become brittle, thereby generating powdering.

In the hot-stamped coated steel part according to the invention, the coating is such that, in at least one undeformed portion of the hot-stamped coated steel part, and provided that $40 \leq E_{pc} \leq 80$, the coating has a lineic density of cracks dC higher than or equal to a minimum lineic density of cracks $dC_{min}$ ($e_{pflat}$) depending on the thickness $e_{pflat}$ of the undeformed portion, and defined as:

$$dC_{min}(e_{pflat}) = 15.5 + 91 * e^{-7.44 - 2.88 * arctan(5.49 * (e_{pflat} - 1.71))} - 106.5 * e^{-8.62 - 3.34 * arctan(5.49 * (e_{pflat} - 1.71))}$$

In this expression, $dC_{min}(e_{pflat})$ is the minimum lineic density of cracks expressed in number of cracks per mm, and $e_{pflat}$ designates the thickness of the undeformed portion in mm. The lineic density of cracks dC is as well a number of cracks per mm. "e" designates the exponential function.

Here "lineic density of cracks", designating a number of cracks per millimeter, is of course not a volumic density, but a lineic density in that it measures how many cracks are present in a cross-section of the coating over a given length in a direction parallel to the surface of the steel substrate.

Indeed, the inventors conducted an intensive research to solve the problems of increasing the spot weldability and the painting adhesion, and surprisingly discovered that, contrary to the established belief that cracks would be detrimental to the properties of a hot-stamped coated steel part, if the lineic density of cracks exceeds a threshold, the spot weldability and the painting adhesion are together drastically increased.

The inventors also discovered that the relevant portion(s) of the part with respect to the lineic density of cracks is the undeformed portion(s), which though having been subjected to the same thermal cycle as the deformed portion, was not subjected to a deformation, either because it was located on the flange of the hot-stamped part, or because it is located in a flat zone between two deformed portions of the part (e.g. the flat top portion of a hat-shaped part as illustrated on FIG. 1).

Indeed, in the deformed portions, the coating is subjected to deformations upon stamping, which, owing to the difference in dilatation between the substrate and the coating, and depending on the temperature of deformation and the applied deformation rate at each location, will result in cracks in the coating. However, the inventors found that having a high number of cracks in some deformed portions is not sufficient to ensure an excellent spot weldability and excellent painting adhesion, at least in that it does not guarantee such properties in other portions of the hot-stamped coated steel part.

Preferably, the undeformed portion is located in the flange of the part, which is the area the most likely to be subjected to spot welding, so that having an excellent spot weldability (as well as an excellent painting adhesion) in this portion is particularly desirable.

The inventors further discovered that the threshold for the lineic density of cracks is not an absolute value, but depends on the thickness of the undeformed portion, and that achieving the desired spot weldability and painting adhesion requires a higher lineic density of cracks as the thickness of the undeformed portion decreases.

As a result of these investigations, the inventors found that, provided that the coating of the part is such that $40 \leq E_{pc} \leq 80$, excellent spot weldability and painting adhesion are achieved when, in the undeformed portion, the lineic density of cracks in the coating is higher than or equal to $dC_{min}$.

Preferably, the lineic density of cracks in the coating remains of at most $4*dC_{min}$, preferably at most $3*dC_{min}$.

Preferably, the hot-stamped coated steel part comprising two or more undeformed portions, the lineic density of cracks dC(i) in each undeformed portion is higher than or equal to the minimum lineic density of cracks, noted $dC_{min}$ ($e_{pflat}(i)$), associated to the thickness $e_{pflat}(i)$ of this undeformed portion.

Hence, the undeformed portions each having a thickness $e_{pflat}(i)$ from 0.6 mm to 3.5 mm, i=1 . . . n being an index associated to one of the undeformed portions, n≥2 being the number of undeformed portions, a lineic density of cracks dC(i) in the coating in each undeformed portion of thickness $e_{pflat}(i)$ is higher than or equal to $dC_{min}$ ($e_{pflat}$ (i)) with:

$$dC_{min}(e_{pflat}(i)) = 15.5 + 91 * e^{-7.44 - 2.88 * arctan(5.49 * (e_{pflat}(i) - 1.71))} - 106.5 * e^{-8.62 - 3.34 * arctan(5.49 * (e_{pflat}(i) - 1.71))}$$

wherein dC(i) and $dC_{min}$($e_{pflat}$ (i)) are expressed in numbers of cracks per mm, and $e_{pflat}(i)$ designates the thickness of the considered undeformed portion expressed in mm.

This formula is valid whether the undeformed portions all have the same thickness or different thicknesses.

The cracks in the coating extend from the surface of the coating in a direction substantially orthogonal to the surface of the steel substrate (i.e. the interface between the steel substrate and the coating), over a depth of at least 5 μm. The cracks have a width (in a direction parallel to the surface of the steel substrate) lower than 2 μm.

Thus, the cracks are distinct from possible gaps in the coating, having a width of more than 2 μm, from cracks in deformed portions, which may also have a width of more than 2 µm, and from porosities or coating defects, which affect the coating over a depth lower than 5 µm.

Additionally, as mentioned above, in the undeformed portion, the cracks generally have a width of at most 1 µm. In particular, the average width of the largest cracks, the largest cracks being the cracks with a width larger than the width of 90% of the cracks in the coating, is lower than 1 µm. In other words, among the cracks observed, the 10% of cracks with the largest widths have an average crack width of less than 1 µm. The average here designates the average computed from the widths of all the largest cracks.

By contrast, in a deformed portion, the coating comprises more cracks with a width larger than 1 µm, which can be as large as 2 µm or even 3 µm, such that the average width of the cracks is generally larger than 1 µm. In any case, the or each deformed portion is such that the average width of the cracks having a width larger than the width of 90% of the cracks is larger than 1 µm.

Preferably, the coating in the undeformed portion does not comprise any gaps or cracks having a width of 2 µm or more.

The lineic density of cracks is determined as the ratio between the number of cracks observed in cross-sections of the undeformed portion with a bright field optical microscope over a total length of observation (in a direction parallel to the surface of the steel substrate) of at least 5 mm, and this total length (i.e. the number of cracks divided by the total length).

Especially, the lineic density of cracks in the coating is determined by observing cross-sections of the coating of two samples taken from the undeformed portion of the hot-stamped coated steel part with a bright field microscope with a 500× magnification, over several fields of view, such that the total length of the fields of view (in a direction parallel to the surface of the steel substrate) is of at least 5 mm. Then, the lineic density of cracks is determined as the ratio between the number of cracks observed and the total length of the field of view.

Indeed, the inventors have found that, to guarantee the targeted excellent spot weldability and excellent painting adhesion, having a lineic density of cracks of at least $dC_{min}$ over only a small portion of the coating is not sufficient. They further found that to achieve these properties, having a lineic density of cracks of at least $dC_{min}$ measured over a length of at least 5 mm is necessary.

The average width of the largest cracks is determined by measuring the widths of all the cracks observed over the length of observation, identifying, from these measurements, the largest cracks and computing the average value of the widths of these largest cracks.

In details, the features of the coating described above are determined as follows.

First, samples are taken from the part and prepared.

To that end, the part is cut in the middle of its length to create suitable sized samples of 20×30 mm, in the undeformed portion of the hot-stamped coated steel part.

The cutting step is performed carefully with Hard Iron cutting wheels (for example Struers 60A25) or preferably a micro-cutting device to avoid excessive stress which may damage the samples.

The samples are then cleaned (preferably with ultrasonic bath) and dried with ethanol and compressed air.

The samples are then cold mounted with a resin. Cold mounting is chosen rather than hot mounting because the gap between the resin and the sample is very low or inexistent. This is important because gaps can be the cause of several preparation issues, such as etching problems, scratches, or coating damages. The resin is preferably a Liquid EpoFix® resin, mixed with Epofix Hardener®. The polymerization lasts 10 hours. Two protective metal sheets (guard plates) are provided on opposing sides of the samples in order to protect the coating from surface damage during polishing. Each time, two samples are mounted together so as to ensure that these two samples are then submitted to the same polishing.

The samples are then polished cautiously. The polishing step in an important step for assessing the features of the coating, as an incorrectly conducted polishing will introduce defects in the coating. These defects include incrusted diamond particles, damages in the coating such as coating flaking, and more importantly cracks in the coating, in particular longitudinal cracks. Longitudinal cracks, extending in a direction substantially parallel to the surface of the steel substrate, can reflect preparation problems and must be avoided during polishing to ensure reliable results when counting the number of cracks.

The polishing is divided in three main stages: disk polishing, diamond polishing and oxide polishing. The samples must be cleaned and dried after each polishing step to remove abrasive contamination and must be checked under optical microscope.

First, samples are polished with abrasive disk SiC paper P320 during 120 s, using a rotational speed of 150 RPM (revolution per minute) for the sample holder and 100 RPM for the disk, turning in the same direction. The force is applied at 15 N. Samples are cleaned by water.

Then, diamond polishing 9 µm is used to remove material from the surface without introducing scratches or deformation. This step is important because it ensures the flatness of the polished surface. The rotational speed is the same as the previous step, but the sample rotation is opposite to the disk rotation. This stage is set to 300 s and using a force of 20N. The polishing disk is damped by a lubricant at an optimal amount (0.5 mL/30 s) to guarantee a better material removal. Samples are cleaned by water.

The final step is an oxide polishing, using a colloidal silica solution (1 mL/5 s). This step lasts 90 s, with a rotational speed of 150 RPM for the sample holder and 60 RPM for the disk, turning in the same direction. The applied force is 20 N. Samples are cleaned firstly by water, follow by ethanol.

The samples are then etched with Nital (2% for 5-10 s) to reveal the steel microstructure and the steel/coating interface.

To determine the total thickness of the coating $e_{coating}$ and the thickness of the interdiffusion layer $e_{IDL}$, a sample is imaged with a Scanning Electron Microscope (SEM) (Back Scattered Electron mode, Magnification 500×, WD (Working distances) preferably of 10 mm, EHT (Electron High Tension Voltage)=15.00 kV, Scale 10 micrometers) to show a cross-section of the coating as well as at least part of the base steel.

From the images, the interdiffusion layer can be identified as the light layer which is the closest to the steel substrate.

The total thickness of the coating (including the interdiffusion layer) and the thickness of the interdiffusion layer are measured at five spots spaced horizontally apart by 15 µm.

The total thickness of the coating and the thickness of the interdiffusion layer are then computed as the averages of the values obtained. The total thickness of the coating $e_{coating}$ and the thickness of the interdiffusion layer $e_{IDL}$ are therefore average thicknesses.

Besides, the composition of the interdiffusion layer can be determined as follows.

The sample is observed with the Scanning Electron Microscope (SEM) to show a cross-section of the coating as well as at least part of the base steel.

By Energy Dispersive Spectroscopy (EDS), at five different horizontal locations, two spots spaced vertically in the interdiffusion layer are considered, and the composition is determined at the ten spots.

The composition of the interdiffusion layer is then computed as the average of the values obtained.

If needed, the composition of the whole coating can be measured with EDS.

The determination of the lineic density of cracks in the coating of the undeformed portion is performed as follows.

Two samples mounted in the same resin are imaged with a bright field optical microscope (magnification 500×) to show a cross-section of the coating as well as at least part of the steel substrate, at several locations of the samples.

Then, for each sample, ten distinct and non overlapping fields of view are randomly selected and observed. Each field of view has a length (in the direction parallel to the surface of the steel substrate) of at least 250 µm.

The total length of observation, being the total length of the fields of view (in the direction parallel to the surface of the steel substrate) for the two samples, is therefore of 5 mm or more (250 µm*2*10).

In each field of view, first, the absence of longitudinal cracks that would extend in a direction substantially parallel to the surface of the steel substrate, is verified. If longitudinal cracks are present, the field of view is disregarded and replaced, because the presence of such cracks implies that the preparation of the sample (cutting, polishing) was incorrectly performed at this location.

Then in each field of view, the cracks extending from the uppermost surface of the coating, substantially orthogonally to the surface of the steel substrate, in the direction of the steel substrate, are identified.

To distinguish cracks from possible gaps in the coating, only the cracks having a width of less than 2 µm are identified as cracks. Cracks with a width of 2 µm can be identified without difficulty with the magnification of 500×, but if required, the width of the cracks can be measured as detailed below. Additionally, to distinguish cracks from porosities or coating defects, the lengths of the cracks are measured, and only the cracks having a depth of at least 5 µm (in a direction substantially orthogonally to the surface of the steel substrate), are considered as cracks.

The number of cracks is counted in each field of view, and the total number of cracks in the observed twenty fields of view is computed.

The lineic density of cracks in the coating is then determined as the ratio between the total number of cracks and the total length of the fields of view for the two samples.

The determination of the average width of the largest cracks, or more generally of the width of any crack can be performed as follows.

The cross-sections used for assessing the lineic density of cracks are observed with a bright field microscope with a 500× magnification, using a camera with a resolution of 3072*2048 pixels, the images being displayed such that one pixel of the camera is displayed as one pixel on the image. The magnification in imaging is of 3020×.

The width of each of the cracks in all the fields of view is determined.

To that end, for each crack, the width is measured at three locations located at the center of the crack and at a distance of 2 µm on each side of the center. The average value of the three widths is determined as the width of the crack.

The cracks with the largest widths, i.e. larger than the widths of 90% of the cracks in the coating, are then identified. These cracks are therefore the 10% of cracks having the largest widths. The average width of these cracks is then computed as the sum of their individual widths divided by their number.

If the number of cracks is such that 90% of the number of cracks is not an integer, the result of 90% by the number of cracks is rounded to the closest integer (For instance, 90% of 108 cracks is 97 cracks and 90% of 135 cracks is considered as 122 cracks).

The hot-stamped coated steel part according to the present disclosure has a welding range, as measured according to the standard SEP 1220-2 (2011), of more than 1 kA, at least in the undeformed portion.

The hot-stamped coated steel part further has an excellent painting adhesion, in that, at least in the undeformed portion, when subjected to a dry painting adhesion and a wet painting adhesion test according to the standard ISO 2409:2013, the dry painting adhesion is strictly lower than 1 and the wet painting adhesion is lower than or equal to 1.

A method for producing the hot-stamped coated steel part according to the present disclosure will now be disclosed.

The method comprises providing a steel blank having an average thickness generally of 0.6 mm to 3.5 mm, preferably from 0.7 mm to 3.0 mm. This thickness is generally the same as the average thickness $e_P$ of the hot-stamped coated steel part destined to be produced from the blank.

The blank comprises, on at least one face, an aluminium or an aluminum alloy pre-coating, the pre-coating having an average thickness comprised between 19.91 µm and 40 µm.

Preferably, the blank comprises an aluminium or an aluminum alloy pre-coating having an average thickness comprised between 19.91 µm and 40 µm on each of its two main faces.

This pre-coating can be aluminum or an aluminum alloy (comprising over 50% aluminum).

Advantageously the pre-coating is an aluminum-silicon alloy comprising by weight 7% to 15% silicon, 2% to 4% iron and optionally from 0.0015% to 0.0030% of calcium, the remainder being aluminum and inevitable impurities resulting from elaboration.

Preferably, the pre-coating comprises, by weight, from 8% to 11% Si, from 2% to 4% Fe, optionally from 0.0015% to 0.0030% of Ca, the remainder being Al and impurities resulting from the smelting.

The pre-coating is generally obtained by hot-dip coating in an Al or Al-alloy bath.

In an embodiment, the blank is a monolithic blank, i.e. a blank consisting of one single sub-blank obtained by cutting a pre-coated steel sheet.

The monolithic blank is for example a tailor rolled blank, i.e. a blank having a variable thickness obtained by differential rolling during the steel sheet production process.

In another embodiment, the blank is a tailor welded blank produced by assembling, in particular welding together, for example by laser welding, several blanks cut from different pre-coated steel sheets, known as sub-blanks.

In an embodiment, the blank has a uniform thickness from 0.6 mm to 3.5 mm, preferably from 0.7 mm to 3.0 mm.

In another embodiment, the blank being a tailor rolled blank or a tailor welded blank, the blank has a variable thickness.

In this case, the blank is made of two or more regions having different thicknesses $e_{Bi}$ each of 0.6 mm to 3.5 mm, preferably from 0.7 mm to 3.0 mm. Each region of the blank with a given thickness $e_{Bi}$ corresponds to a region of thickness $e_{Pi}$ of a final hot-stamped coated steel part.

In any case, the blank comprises a flat portion with a uniform thickness $e_{Bflat}$ which is destined to become, after the hot-stamping process, an undeformed portion of the hot-stamped coated steel part. The thickness $e_{Bflat}$ is also from 0.6 mm to 3.5 mm, preferably from 0.7 mm to 3.0 mm.

In other words, the thickness $e_{Bflat}$ is the thickness of a portion of the blank transformed into the corresponding undeformed portion of the hot-stamped coated steel part upon hot-stamping.

The thickness $e_{Bflat}$ of the portion of the blank equals the thickness $e_{Pflat}$ of the corresponding undeformed portion of the part.

In an embodiment, the blank comprises two or more portions each with a uniform thickness $e_{Bflat(i)}$ (with i=1 . . . n, n being the number of such portions) which are destined to become, after the hot-stamping process, two or more undeformed portions of the hot-stamped coated steel part.

Each thickness $e_{Bflat(i)}$ is comprised between 0.6 mm and 3.5 mm, preferably between 0.7 mm and 3.0 mm. Additionally, each thickness $e_{Bflat(i)}$ is equal to the thickness $e_{Pflat(i)}$ of a corresponding undeformed portion of the part.

If the thickness of the blank is uniform, the thickness $e_{Bflat}$, or if applicable each thickness $e_{Bflat(i)}$, equals the thickness $e_B$ of the blank.

The blank or, if the blank is a tailor welded blank, each sub-blank, is preferably made of a steel having a composition as disclosed above, in particular according to the first, second or third preferred composition. The sub-blanks may be have the same steel composition, or different steel compositions.

The blank or each sub-blank is for example produced as follows.

A semi-product in the form of a slab, a thin slab or and ingot, able to be further hot-rolled, is provided, preferably with the steel composition described above. The thickness of this semi-product is typically comprised between 50 and 250 mm.

If needed, this semi-product is heated to a temperature generally comprised between 1100° C. and 1300° C., then hot-rolled with a finish rolling temperature preferably comprised between 88° and 950° C. so to obtain a hot-rolled steel sheet. The hot-rolled steel sheet is coiled at a temperature Tc lower than or equal to 750° C., and generally higher than or equal to the Ms temperature of the steel.

At this stage, the thickness of the hot-rolled steel sheet may be in the typical range of 1.5-4 mm. Depending on the thickness of the hot-rolled steel sheet and the desired thickness for the sheet, the steel sheet may be pickled in usual conditions and further cold rolled, or directly annealed with the process described below.

If the blank to be produced is a tailor rolled blank, the steel sheet can be produced by differential rolling (or continuous flexible rolling), i.e. by a process wherein the sheet thickness obtained after rolling is variable in the rolling direction, in relationship with the load which has been applied through the rollers to the sheet during the rolling process.

After hot-rolling or cold-rolling, the steel sheet is annealed at a temperature typically comprised between Ac1 and Ac3, generally between 70° and 850° C., in preparation for the coating, and, in case a cold-rolling was performed, to recrystallize the grains. The sheet is then hot-dipped in an Al or Al-alloy bath at a temperature generally of about 670-680° C., the exact temperature depending on the composition of the bath.

A preferred pre-coating is Al—Si which is obtained by hot-dipping the sheet in a bath comprising, by weight, from 7% to 15% of Si, from 2% to 4% of Fe, optionally from 0.0015% to 0.0030% of Ca, the remainder being Al and impurities resulting from the smelting.

Preferably, the bath comprises, by weight, from 8% to 11% Si, from 2% to 4% Fe, optionally from 0.0015% to 0.0030% of Ca, the remainder being Al and impurities resulting from the smelting.

The pre-coated steel sheet is thereafter cooled to room temperature.

The pre-coated steel sheet is cut to obtain a blank (or a sub-blank), whose geometry is related to the final geometry of the hot-stamped coated steel part.

If the blank from which the part is to be produced is a tailor welded blank, the sub-blanks thus produced as disclosed above are welded together.

In an embodiment, the sub-blanks have the same compositions. In another embodiment, the composition of the sub-blanks differ. This is in particular the case if different mechanical properties are required at different locations of the final part. As an example, the composition of the steel in a first sub-blank is selected among the three preferred compositions above, and the composition of a second sub-blank is selected among the two other preferred compositions, or within the same preferred composition as the first sub-blank but with a different specific composition.

In an embodiment, the sub-blanks have the same uniform thickness. In another embodiment, the sub-blanks have different thicknesses.

As an option, before the heating and hot-stamping steps in the die, the blank can be cold formed so to obtain a predeformed blank. This cold predeformation makes it possible to reduce the amount of deformation in the next hot stamping step. In any event, the portion(s) of the blank destined to become, after the hot-stamping process, an undeformed portion of the hot-stamped coated steel part is not deformed during such a cold predeformation. Hence, this portion of the blank remains a flat portion. On the other hand, the portions of the blank which are then subjected to a deformation in hot-stamping are only partly deformed during the cold predeformation. Consequently, it is ensured that the cold predeformation has no impact on the targeted coating properties.

Then, the blank (either flat or cold predeformed), is heated in a furnace to a temperature $T_{heat}$ comprised between 85° and 970° C.

The heating comprises a first heating stage, wherein the temperature of the blank remains below the melting temperature $T_{melt}$ of the pre-coating, and a second heating stage, wherein the temperature of the blank is higher than or equal to the melting temperature $T_{melt}$ of the pre-coating, up to the heating temperature $T_{heat}$.

The heating means are not limited and can be radiation, conduction, induction, or resistance-based.

The time spent by the blank during each of these two stages can be adjusted by controlling the furnace, in particular by using a furnace with different sections each having independent settings, for instance in terms of power and temperature, so that the heating rate can be adjusted in each of these sections independently from each other. For example, if a high heating rate is desired in the first heating stage, a first section of the furnace can be set to a high temperature and high power to ensure such a rapid heating. If a low heating rate is then desired up to the final heating temperature $T_{heat}$, several sections can be used with slight increases in furnace temperature from a section to the other, to ensure a longer time above the melting temperature $T_{melt}$ of the pre-coating. Or conversely, if a short heating time is desired from the melting temperature $T_{melt}$ of the pre-coating and the heating temperature $T_{heat}$, a high temperature can be set in a section of the furnace, and the blank can be transferred to a section at the targeted heating temperature $T_{heat}$ before this temperature is reached.

Besides, the skilled person knows how to determine the melting temperature of a pre-coating knowing its composition, for example using a ternary phase diagram.

The heated blank is then held at the heating temperature $T_{heat}$ in order to get a fully austenitic structure in the steel.

Preferably, the total dwell time in the furnace, including the heating and the holding, is comprised between 1.5 min and 15 min.

The heated blank is then transferred to a die (or hot-stamping press). The transfer time is preferably of at most 15 s, still preferably of at most 10 s or at most 8 s.

The die is then closed to stamp the blank into a part, the temperature of the blank when the die is closed being noted $T_{close}$.

Preferably, the elapsed time between the transfer of the heated blank into the die and the closing of the die is of less than 8 s.

The heating and holding causes the interdiffusion of the pre-coating with the steel substrate. In particular, during the heating and holding, iron diffuses from the steel substrate towards the coating and aluminium diffuses from the coating to the steel substrate, this interdiffusion leading to the formation of the interdiffusion layer of the coating.

Additionally, depending on the composition of the pre-coating, one or more intermetallic phases can be created by interdiffusion above the interdiffusion layer (thus in the outer layer of the part) in the form of a solid solution.

According to the present disclosure, the heating, the holding, the transfer, the closing of the die and the cooling in the die are controlled, as a function of the thickness $e_{Bflat}$ of the flat portion of the blank transformed into the undeformed portion upon hot-stamping, in order to achieve a lineic density of cracks dC in the coating of the undeformed portion of the hot-stamped steel part higher than or equal to $dC_{min}$.

In particular, the inventors have found that the relevant factor for achieving the desired lineic density of cracks in the coating of the undeformed portion, i.e. a lineic density of cracks dC higher than or equal to $dC_{min}$, is not the time spent in the furnace, but the time $t_M$ spent by the blank above the melting temperature of the pre-coating $T_{melt}$ in the hot-stamping process, in combination with the temperature $T_{close}$ of the blank when the die is closed.

This time $t_M$ includes the heating in the second stage mentioned above (above $T_{melt}$), the holding time $t_{heat}$ at the heating temperature $T_{heat}$, the transfer time and the time spent by the blank within the die (before and after stamping) until the formed blank reaches the temperature $T_{melt}$ upon cooling.

This time $t_M$ can be determined and controlled during the hot-stamping process by monitoring the temperature of the blank during the heating and adjusting the time spent above $T_{melt}$ as detailed above, by controlling the holding time $t_{heat}$ at the heating temperature $T_{heat}$, and by controlling the time spent by the blank during the transfer to the die and the cooling within the die down to $T_{melt}$.

The inventors have found that in order to obtain a lineic density of cracks of at least $dC_{min}$, the temperature $T_{close}$ must be comprised between 72° and 820° C., and the time $t_M$ spent above the melting temperature $T_{melt}$ of the pre-coating must be comprised between a minimum time $t_{Mmin}$ and a maximum time $t_{Mmax}$ which depend on the thickness $e_{Bflat}$ of the flat portion of the blank destined to become the undeformed portion, on the heating temperature $T_{heat}$ and on the melting temperature $T_{melt}$ of the pre-coating.

The minimum time $t_{Mmin}$ and maximum time $t_{Mmax}$ are defined as follows:

$$t_{Mmin} = \frac{10.7 * e_{Bflat} + 4.8}{\left(\frac{T_{heat} - Tmelt}{1000}\right)^2}$$

$$\text{and } t_{Mmax} = \frac{4.96 + 0.444 * e_{Bflat} + 2.71 * \arctan(9.52 * (e_{Bflat} - 1.71))}{\left(\frac{T_{heat} - T_{melt}}{1000}\right)^5}$$

In these expressions, $t_{Mmin}$ and $t_{Mmax}$ are expressed in seconds, $T_{heat}$ designates the heating temperature of the blank in ° C., $T_{melt}$ designates the melting temperature of the pre-coating in ° C. and $e_{Bflat}$ designates the thickness of the flat portion of the blank which is not deformed upon hot-stamping and thus destined to become the undeformed portion of the part, in mm.

Indeed, the inventors have found that satisfying these conditions allows achieving, after hot-stamping and cooling, a hot-stamped coated steel part such that the lineic density of cracks in the coating of the undeformed portion is higher than or equal to $dC_{min}$.

By contrast, when the time $t_M$ does not satisfy the above relationship and/or the temperature $T_{close}$ is above 820° C. or below 720° C., the lineic density of cracks is insufficient, so that it is not possible to achieve at the same time an excellent spot weldability and an excellent painting adhesion.

In particular, below the minimum time $t_{Mmin}$, the lineic density of cracks is insufficient, and neither the painting adhesion nor the spot weldability is satisfactory.

On the other hand, above the maximum time $t_{Mmax}$, the lineic density of cracks is insufficient, and even if the painting adhesion may be enhanced by the higher time spent above the melting temperature, the spot weldability becomes too low.

Of course, given that both $t_{Mmin}$ and $t_{Mmax}$ depend on the heating temperature $T_{heat}$, not only the time $t_M$, but also the heating temperature $T_{heat}$ can be adjusted so that the time $t_M$ is comprised between $t_{Mmin}$ and $t_{Mmax}$.

In an embodiment, the blank having a uniform thickness $e_B$, which is then equal to the thickness $e_{Bflat}$ of the portion of the blank destined to become the undeformed portion of the part, $t_{Mmin}$ and $t_{Mmax}$ thus become:

$$t_{Mmin} = \frac{10.7 * e_B + 4.8}{\left(\frac{T_{heat} - Tmelt}{1000}\right)^2}$$

$$\text{and } t_{Mmax} = \frac{4.96 + 0.444 * e_B + 2.71 * \arctan(9.52 * (e_B - 1.71))}{\left(\frac{T_{heat} - T_{melt}}{1000}\right)^5}$$

If the blank has a variable thickness, preferably, and depending on the required properties, the time $t_M$ may be adjusted so that it is comprised between the times $t_{Mmin}(e_{Bi})$ and $t_{Mmax}(e_{Bi})$ for additional portions/regions of the blank with thicknesses $e_{Bi}$.

In that case, the values of $t_{Mmin}$ and $t_{Mmax}$ can be calculated for each of the considered portion as a function of the thickness of this portion of the blank $e_{Bi}$. Then, the time $t_M$ is selected between the maximal value of the computed minimum times $t_{Mmin}$ and the minimal value of the computed maximum times $t_{Mmax}$:

$$\text{Max}[t_{Mmin}(e_{Bflat}), t_{Mmin}(e_{Bi}) \ldots ] \leq t_M \leq \text{Min}[t_{Mmax}(e_{Bflat}), t_{Mmax}(e_{Bi}) \ldots ]$$

The values of $t_{Mmin}$ and $t_{Mmax}$ being increasing functions of the thickness, this can be simplified as follows:

$$t_{Mmin}(\text{Max}(e_{Bflat}, e_{Bi} \ldots)) \leq t_M \leq t_{Mmax}(\text{Min}(e_{Bflat}, e_{Bi} \ldots))$$

In other words, if it is desired to ensure a lineic density of cracks above the minimum lineic density of cracks $dC_{min}$ in two or portions of the part, produced from two or more portions of the blank with different thicknesses, the time $t_M$ is then comprised between the minimum time $t_{Mmin}$ defined for the thickest portion and the maximum time $t_{Mmax}$ defined for the thinnest portion.

Preferably, if the hot-stamping is performed to create a hot-stamped coated steel part comprising two or more undeformed portions, by hot-stamping the blank such that two or more portions with thicknesses $e_{Bflat}(i)$ with $i=1 \ldots n$, are not deformed, the time $t_M$ is comprised between the minimum time $t_{Mmin}$ required for the thickest portion and the maximum time $t_{Mmax}$ required for the thinnest portion.

$$t_{Mmin}(\text{Max}(e_{Bflat(i)} \text{ with } i = 1 \ldots n)) \leq$$

$$t_M \leq t_{Mmax}(\text{Min}(e_{Bflat(i)} \text{ with } i = 1 \ldots n))$$

In that case, it is ensured in all the considered flat portions of the blank corresponding to undeformed portions of the part are produced with a time $t_M$ comprised between the minimum and maximum times $t_{Mmin}$ and $t_{Mmax}$ corresponding to their actual thicknesses $e_{Bflat(i)}$.

Still preferably, the blank having a minimum thickness $e_{Bmin}$ and a maximum thickness $e_{Bmax}$, the time $t_M$ is comprised between the minimum time $t_{Mmin}$ required for the maximum thickness $e_{Bmax}$ and the maximum time $t_{Mmax}$ required for the minimum thickness $e_{Bmin}$:

$$t_{Mmin}(e_{Bmax}) \leq t_M \leq t_{Mmax}(e_{Bmin})$$

In that case, it is ensured that all the regions of the blank are hot-stamped with a time $t_M$ comprised between the minimum and maximum times $t_{Mmin}$ and $t_{Mmax}$ corresponding to their actual thicknesses.

Preferably, the temperature $T_{close}$ of the blank when the die is closed is of at least 740° C.

In an embodiment, the temperature $T_{close}$ is of at most 800° C.

Especially, a temperature $T_{close}$ of at most 800° C. allows achieving a lineic density of cracks of at most $4*dC_{min}$, reducing the risks of powdering.

The heated blank is hot-stamped and die-quenched in the die.

In hot-stamping, as detailed above, one or more portion of the blank is not subjected to a deformation and at least one portion is deformed through hot-stamping.

The portion of the blank not subjected to a deformation becomes the undeformed portion of the hot-stamped coated steel part obtained by the process.

The portion(s) of the blank subjected to a deformation create the deformed portion(s) of the hot-stamped coated steel part.

The modes and quantities of deformation in the deformed portions differ from one place to another because of the geometry of the final part and of the forming tools. For example, some zones may be in expansion, while others are deformed in restraint. Whatever the deformation mode, as outlined above, an equivalent deformation $\varepsilon_b$ can be defined at each location in the press hardened part, as $$\varepsilon_b = \frac{2}{\sqrt{3}} \sqrt{(\varepsilon_1^2 + \varepsilon_1 \varepsilon_2 + \varepsilon_2^2)},$$

wherein $\varepsilon_1$ and $\varepsilon_2$ are the principal deformations. Thus, $\varepsilon_b$ expresses the amount of strain introduced by the hot stamping process in each zone of the deformed portions.

In the undeformed portion(s), the equivalent deformation $\varepsilon_b$ is of at most 0.01.

The hot-stamped blank is then kept within the dies so as to ensure a proper cooling rate and to avoid part distortion due to shrinkage and phase transformations.

The hot-stamped blank is mainly cooled by conduction through heat transfer with the die. The die may include coolant circulation so as to increase the cooling rate, or heating cartridges so as to lower cooling rates. Thus, the cooling rates can be adjusted through the implementation of such means.

The hot-stamped blank is cooled to a temperature lower than 400° C.

The cooling rate applied depends on the composition of the steel and on the desired structure and mechanical properties.

The average cooling rate from the temperature $T_{heat}$ to 400° C. (including the cooling during the transfer and the cooling in the die) is generally of at least 27° C./s, preferably of at least 50° C./s, and generally lower than 200° C./s.

Preferably, the blank is cooled within the die, from the temperature of the blank when the die is closed to 400° C., with an average cooling rate of at least 30° C./s, still preferably of at least 50° C./s.

For instance, if the steel has a composition in accordance with the first preferred composition above, the hot-stamped blank is preferably first cooled in a temperature range between 75° and 450° C., at a first average cooling rate comprised between 4° and 360° C./s. Within this range, a transformation of austenite into martensite and possibly bainite occurs. In a further step, the hot-stamped blank is cooled in a temperature range comprised 450° C. and 250° C., at an average cooling rate between 15 to 150° C./s, slower than the first cooling rate.

If the steel has a composition in accordance with the second preferred composition, the hot-stamped blank is preferably cooled within the die with an average cooling rate of at least 30° C./s from the exit of the furnace to a temperature below 400° C., to achieve a structure consisting essentially of martensite.

If the steel has a composition in accordance with the third preferred composition, the hot-stamped blank is preferably cooled within the die to obtain a structure consisting of martensite or consisting of martensite and bainite.

In any case, the hot-stamped blank are cooled to a temperature lower than 400° C. within the die and then cooled to room temperature, to obtain a hot-stamped coated steel part.

EXAMPLES

Steels with compositions A, B, C and D according to Table 1, expressed in weight percent, have been provided under the form of blanks cut from pre-coated steel sheets with uniform thicknesses $e_B$.

The blanks were pre-coated on both sides with an Al—Si pre-coating, with a composition comprising 8% to 11% Si, 2% to 4% Fe, the remainder being Al and impurities resulting from the smelting. The pre-coatings all had a melting temperature $T_{melt}$ of 577° C.

The pre-coating thickness was adjusted to the range of 19.91 to 40 μm in each case, the pre-coating thicknesses being reported in Table 2 below, together with the thicknesses $e_B$ of the sheets.

TABLE 1

| | C (%) | Mn (%) | Si (%) | Al (%) | Mo (%) | Ti (%) | Nb (%) | Cr (%) | Ni (%) | N (%) | B (%) | S (%) | P (%) | Cu (%) |
|---|---|---|---|---|---|---|---|---|---|---|---|---|---|---|
| A | 0.219 | 1.19 | 0.26 | 0.04 | 0.002 | 0.039 | 0.001 | 0.18 | 0.01 | 0.005 | 0.0031 | 0.0013 | 0.012 | 0.011 |
| B | 0.078 | 1.63 | 0.36 | 0.03 | 0.002 | 0.016 | 0.054 | 0.07 | 0.01 | 0.005 | 0.0029 | 0.0010 | 0.012 | 0.008 |
| C | 0.223 | 1.18 | 0.26 | 0.03 | 0.002 | 0.038 | 0.001 | 0.19 | 0.01 | 0.006 | 0.0029 | 0.0011 | 0.013 | 0.009 |
| D | 0.332 | 0.65 | 0.52 | 0.02 | 0.182 | 0.009 | 0.05 | 0.33 | 0.37 | 0.004 | 0.0022 | 0.0019 | 0.011 | 0.011 |

The remainder of the compositions is iron and unavoidable impurities (the unavoidable impurities including Cu whose contents are reported above).

These pre-coated steel sheets have been cut into blanks.

The blanks were then heated in a furnace at a temperature $T_{heat}$, maintained at $T_{heat}$ and then transferred in a die within 8 s.

The blanks were then hot-stamped within the die so as to create a part having deformed portions and a flat undeformed portion. In each case, the die was closed when the temperature $T_{close}$ of the blank was of 750° C.

The hot-stamped blanks were then cooled in the die to a temperature lower than 400° C., then extracted from the die and cooled to room temperature to obtain hot-stamped coated steel parts.

The heating, holding, transfer, and cooling in the die were adjusted to arrive at varying times $t_M$ above the melting temperature of the pre-coating $T_{melt}$ for each steel composition.

For each example, the time $t_M$ spent by the blank above the melting temperature $T_{melt}$ of the pre-coating is reported in Table 2, and compared with the minimum and maximum times $t_{Mmin}$ and $t_{Mmax}$.

The minimum and maximum times $t_{Mmin}$ and $t_{Mmax}$ were computed with the above equations from the thickness $e_B$ of the blank, which equals the thickness of the portion of the blank from which the undeformed portion results.

TABLE 2

| Ex. | Steel | Pre-coating thickness (μm) | $e_B$ (mm) | $T_{heat}$ (° C.) | $t_{Mmin}$ (s) | $t_M$ (s) | $t_{Mmax}$ (s) |
|---|---|---|---|---|---|---|---|
| 1 | A | 24.2 | 1.8 | 880 | 262 | 156.5 | 3007 |
| 2 | | | | 900 | 231 | 336.5 | 2184 |
| 3 | | | | 950 | 173 | 1716.5 | 1064 |
| 4 | B | 25.6 | 1.8 | 880 | 262 | 156.5 | 3007 |
| 5 | | | | 900 | 231 | 336.5 | 2184 |
| 6 | | | | 950 | 173 | 1716.5 | 1064 |
| 7 | C | 30.2 | 1.2 | 880 | 192 | 184.3 | 699 |
| 8 | | | | 900 | 169 | 304.3 | 508 |
| 9 | | | | 950 | 127 | 1744.3 | 247 |
| 10 | D | 29.5 | 1.2 | 880 | 192 | 184.3 | 699 |
| 11 | | | | 900 | 169 | 304.3 | 508 |
| 12 | | | | 950 | 127 | 1744.3 | 247 |

The hot-stamped blanks were then cooled within the die to a temperature lower than 400° C. to achieve hot-stamped coated steel parts having a martensitic structure.

The hot-stamped coated steel parts have a uniform thickness $e_P$ equal to the thickness $e_B$ of the blank from which these parts were produced (and such that $e_P = e_{Pflat}$).

Samples were taken from an undeformed portion of each part, and prepared as described above.

The total thickness of the coating $e_{coating}$ and the thickness of the interdiffusion layer $e_{IDL}$ were determined using the protocol disclosed above, as well as the lineic density of cracks in the coating.

The lineic density of cracks in the coating of the undeformed portion was in each case determined by observing, for each of two samples, ten fields of view, with a total length of observations for the two samples of 5.29 mm.

The value of $E_{pc}$ determined according to the above formula, from the measured total thickness of the coating $e_{coating}$ and thickness of the interdiffusion layer $e_{IDL}$, are reported in Table 3 below.

The lineic density of cracks dC is also reported in Table 3, together with the minimal lineic density of cracks $dC_{min}$.

The painting adhesion was assessed as follows for each part.

A sample was taken from the undeformed portion of each part.

The samples were first degreased, then cleaned with Gardoclean®5176 and a surfactant at 55° C. for 6 min. A refining was performed with Gardolene® ZL6.

A phosphating step was realized by dipping the samples into a bath comprising a solution of Gardobond® R24 TA and additives during 3 minutes at 50° C.

An e-coating layer of 20 μm was then deposited by dipping the samples into a bath comprising an aqueous solution comprising Pigment Paste® W9712-N6 and Resin Blend® W7911-N6 of PPG Industries, and applying a nominal voltage with a voltage ramp-up duration of 30 s, for a total duration of 180 seconds, at 30° C. Then, the samples were wiped and cured in an oven at 175° C. for 30 min.

The dry painting adhesion test was then performed on a first set of samples, by cross hatching the e-coating layer with a cutter (1 mm spaced scratches), ripping the e-coating layer with an adhesive tape (with 460 N/m) and assessing the amount of removed e-coating with naked eye in accordance with ISO 2409:2013: 0 means excellent, in other words, there was a little or no paint removed and 5 means very bad, in other words, a high amount of paint (>65%) was removed.

The wet painting adhesion test was then performed on a second set of samples. The samples were dipped into a sealed box comprising demineralized water during 10 days at a temperature of 50° C.

After the dipping, the surface of the e-coating was cross hatched with a cutter (1 mm spaced scratches), the e-coating was ripped with an adhesive tape (with 460 N/m) and the amount of removed e-coating was assessed with naked eye in accordance with ISO 2409:2013. Again, 0 means excellent, in other words, there was a little or no paint removed and 5 means very bad, in other words, a high amount of paint (>65%) was removed.

Additionally, the spot weldability was assessed by determining the welding range for each of the samples according to the standard SEP 1220-2 (2011).

For examples 7 to 12, having a thickness of 1.2 mm, the following parameters were used:
Electrode: F1-16-20-5.5
Welding force: 4 kN
Welding current: Mid frequency direct current
Welding time: 1 pulse of 320 ms
Holding time: 200 ms For examples 1 to 6, having a thickness of 1.8 mm, the following parameters were used:
Electrode: F1-20-20-8
Welding force: 5 kN
Welding current: Mid frequency direct current
Welding time: 3 pulses of 200 ms (pause time 40 ms)
Holding time: 300 ms The dry and wet painting adhesions and welding ranges thus assessed are reported in Table 3.

TABLE 3

| Ex. | $E_{pc}$ | $e_p$ (mm) | $dC_{min}$ (/mm) | dC (/mm) | Dry painting adhesion | Wet painting adhesion | Welding range |
|---|---|---|---|---|---|---|---|
| 1 | 48.4 | 1.8 | 15.5 | 0.0 | 1 | 2 | >1 kA |
| 2 | 58.0 | 1.8 | 15.5 | 22.5 | 0 | 1 | >1 kA |
| 3 | 54.0 | 1.8 | 15.5 | 14.6 | 0 | 1 | <1 kA |
| 4 | 51.2 | 1.8 | 15.5 | 1.3 | 1 | 2 | >1 kA |
| 5 | 55.8 | 1.8 | 15.5 | 18.5 | 0 | 0.5 | >1 kA |
| 6 | 52.6 | 1.8 | 15.5 | 13.6 | 0 | 0 | <1 kA |
| 7 | 58.5 | 1.2 | 16.2 | 14.2 | 1 | 2 | >1 kA |
| 8 | 66.4 | 1.2 | 16.2 | 16.6 | 0 | 0 | >1 kA |
| 9 | 60.9 | 1.2 | 16.2 | 12.1 | 0 | 1.5 | <1 kA |
| 10 | 57.4 | 1.2 | 16.2 | 13.0 | 1 | 1.5 | >1 kA |
| 11 | 62.0 | 1.2 | 16.2 | 18.7 | 0 | 1 | >1 kA |
| 12 | 52.9 | 1.2 | 16.2 | 15.5 | 0 | 2 | <1 kA |

Referring to Tables 2 and 3, examples 2, 5, 8 and 11 were produced with a method according to the invention, and have a lineic density of cracks higher than or equal to the minimal lineic density of cracks $dC_{min}$.

Figure 2:
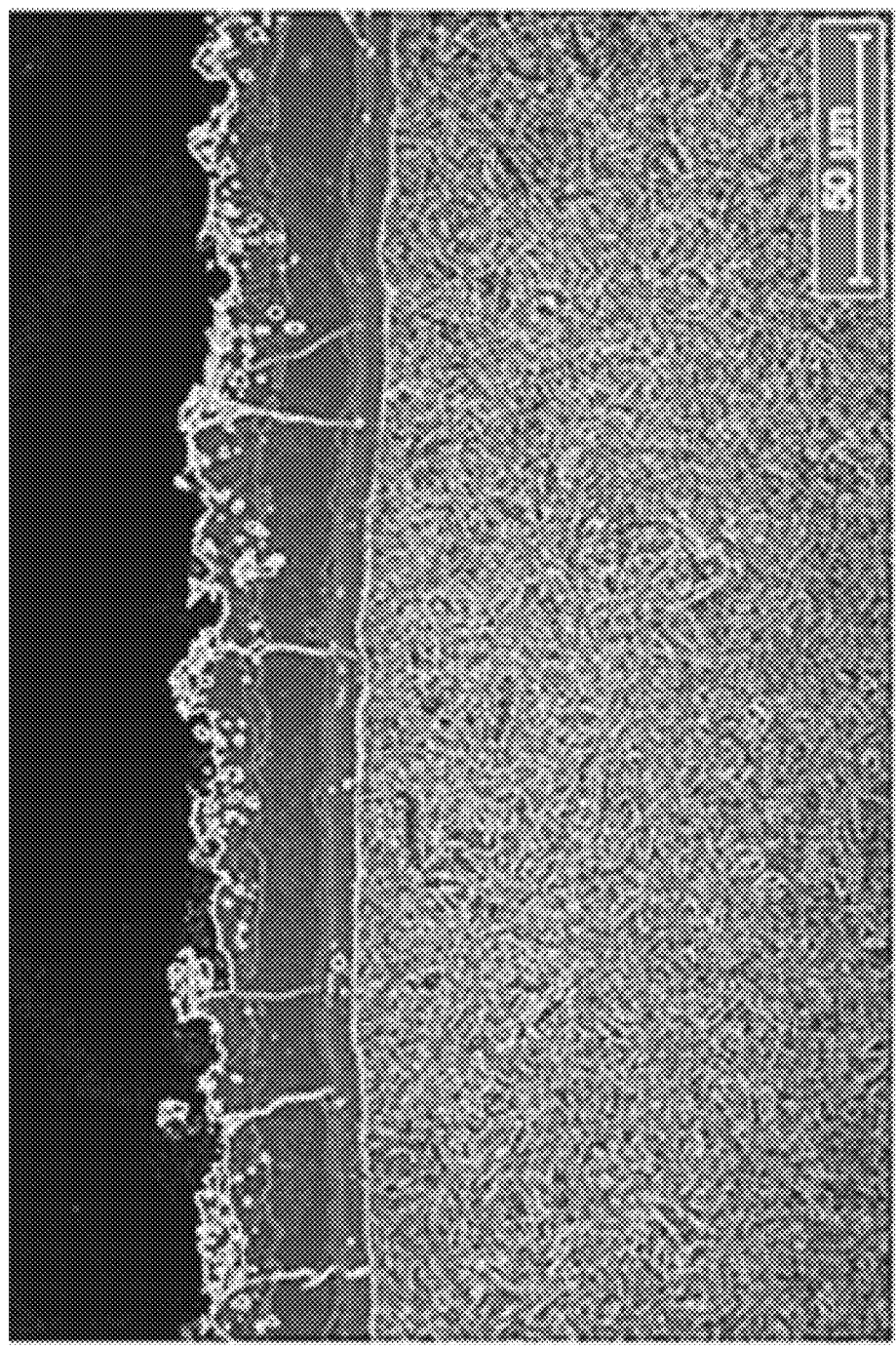
FIG. 2 is a cross-section of a coating in an undeformed portion of a part according to the present disclosure, as observed in a given field of view.

FIG. 2 illustrates the coating of example 2 in cross-section, as seen in one of the fields of view observed to assess the lineic density of cracks. In this image, which was contrasted only for illustration purposes, several cracks extending from the surface of the coating towards the steel substrate are observed.

Of course, as noted above, the lineic density of cracks for example 2 was not determined based on this single field of view, but rather by observing 20 fields of view to make sure that the lineic density of cracks over a sufficient length of observation is of $dC_{min}$ (i.e. 15.5 cracks/mm) or more.

In the examples of the invention it was observed that the cracks are generally uniformly distributed in the coating of the flat undeformed portion, which was not the case for comparative examples 1, 3, 4, 6, 7, 9, 10 and 12 discussed below.

These examples 2, 5, 8 and 11 consequently have an excellent dry painting adhesion, in each case lower than 1 and in fact of 0, meaning that during the tests, no or little paint was removed, an excellent wet painting adhesion of at most 1, together with an excellent spot weldability, the welding range being broader than 1 kA.

Thus, examples 2, 5, 8 and 11 demonstrate that the hot-stamped coated steel parts according to the invention, having a lineic density of cracks higher than or equal to $dC_{min}$, achieve excellent painting adhesion and spot weldability.

Figure 3:
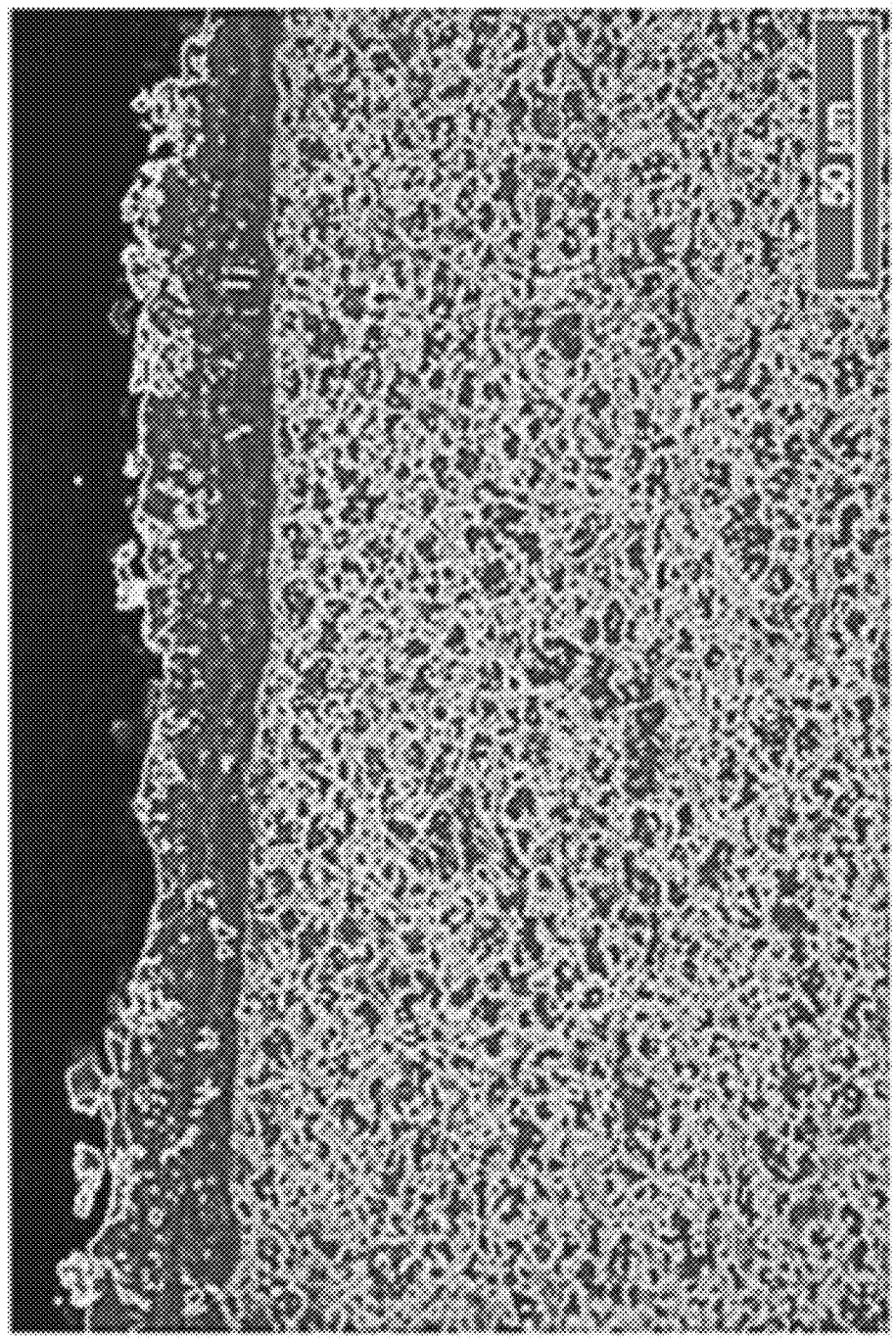
FIG. 3 shows an example of cross-section of a coating in an undeformed portion of a comparative part, in which no cracks are present.

By contrast, examples 1, 4, 7 and 10, were produced with a too short time $t_M$ above the melting temperature of the pre-coating. These examples consequently have a lineic density of cracks lower than $dC_{min}$. An example of a field of view in cross-section of the coating in a flat undeformed portion of example 1 is illustrated on FIG. 3. In this field of view, no crack is present in the coating. As a consequence, examples 1, 4, 7 and 10 have a low painting adhesion, be it the dry painting adhesion which is always of 1, or the wet painting adhesion, in each case higher than 1.

Examples 3, 6, 9 and 12 also have a lineic density of cracks lower than $dC_{min}$. Even if the dry painting adhesion is excellent and the wet painting adhesion is also good for examples 3 and 6, owing to the long time spent above the melting temperature of the coating, the spot weldability is greatly reduced as compared to the parts according to the invention, so that these examples so do reach the aim of the invention.

Additionally, example 12 demonstrates that the minimum lineic density of cracks $dC_{min}$ for achieving this aim does indeed depend on the thickness. Especially, this example demonstrates, by comparison with examples 2 and 5, that having a lineic density of cracks of e.g. 15.5/mm as is the case in example 12 is not sufficient if the part has a thickness of 1.2 mm, but by contrast allows achieving the targeted properties for a higher thickness of 1.8 mm as is the case for examples 2 and 5.

The examples thus confirm that provided that the undeformed portion of the part is such that its coating has a lineic density of cracks higher than or equal to $dC_{min}$, an excellent spot weldability and an excellent painting adhesion are achieved at least in this portion.

Additionally, the examples demonstrate that by adjusting the process so that the temperature $T_{close}$ and the time spent by the blank above the melting temperature of the coating is properly controlled, the desired sufficient lineic density of cracks and consequently, the desired properties can be achieved.

Thus, the steel parts manufactured according to the invention can be used with profit for the manufacture of chassis or body-in-white parts or suspension arms for automobile vehicles.

What is claimed is:

1. A hot-stamped coated steel part comprising a steel substrate and an aluminum alloy coating on at least one face of the steel substrate, the coating comprising, proceeding from steel substrate outwards, an interdiffusion layer and an outer layer, wherein a total thickness of the coating $e_{coating}$ and a thickness of the interdiffusion layer $e_{IDL}$ satisfy the following condition:

$$40 \leq E_{pc} \leq 80$$

with $$E_{pc} = \sqrt{\left(\frac{33.3 - e_{IDL}}{0.9} + e_{IDL} - e_{coating}\right)^2 - 148(e_{IDL} - e_{coating})} - \left(\frac{33.3 - e_{IDL}}{0.9} + e_{IDL} - e_{coating}\right)$$

$e_{IDL}$ designating the thickness of the interdiffusion layer in μm, and $e_{coating}$ designating the total thickness of the coating in μm, and wherein, the hot-stamped coated steel part comprises an undeformed portion having a thickness $e_{Pflat}$ from 0.6 mm to 3.5 mm, and at least one deformed portion, a lineic density of cracks dC in the coating in the undeformed portion is lower than or equal to $4 \ast dC_{min}(e_{Pflat})$ and is higher than or equal to a minimum lineic density of cracks $dC_{min}(e_{Pflat})$ defined as:

$$dC_{min}(e_{pflat}) = 15.5 + 91 \ast e^{-7.44 - 2.88 \ast arctan(5.49 \ast (e_{pflat} - 1.71))} - 106.5 \ast e^{-8.62 - 3.34 \ast arctan(5.49 \ast (e_{pflat} - 1.71))}$$

wherein dC and $dC_{min}(e_{Pflat})$ are expressed in numbers of cracks per mm, and $e_{pflat}$ designates the thickness of the undeformed portion in mm.

2. The hot-stamped coated steel part according to claim 1, wherein the hot-stamped coated steel part has a uniform thickness $e_P$ of between 0.6 mm and 3.5 mm.

3. The hot-stamped coated steel part according to claim 1, wherein the hot-stamped coated steel part has a variable thickness, the hot-stamped coated steel part consisting of two or more regions with distinct thicknesses $e_{Pi}$ each of between 0.6 and 3.5 mm, the hot-stamped coated steel part having an average thickness $e_P$ of between 0.6 mm and 3.5 mm.

4. The hot-stamped coated steel part according to claim 1, wherein the hot-stamped coated steel part comprising two or more undeformed portions each having a thickness $e_{pflat}$ (i) from 0.6 mm to 3.5 mm, a lineic density of cracks dC(i) in the coating in each undeformed portion is higher than or equal to $dC_{min}(e_{pflat}$ (i)) with:

$$dC_{min}(e_{pflat}(i)) = 15.5 + 91 \ast e^{-7.44 - 2.88 \ast arctan(5.49 \ast (e_{pflat}(i) - 1.71))} - 106.5 \ast e^{-8.62 - 3.34 \ast arctan(5.49 \ast (e_{pflat}(i) - 1.71))}$$

wherein $e_{pflat}$ (i) designates the thickness of the considered undeformed portion expressed in mm, with i=1 . . . n, n≥2, and dC(i) and $dC_{min}(e_{pflat}$ (i)) are expressed in numbers of cracks per mm and designate respectively the lineic density of cracks and the minimum lineic density of cracks in the coating of the considered undeformed portion of thickness $e_{pflat}$ (i).

5. The hot-stamped coated steel part according to claim 1, wherein in cross-section, the cracks in the coating of the undeformed portion extend from an uppermost surface of the coating towards the steel substrate, in a direction orthogonal to the surface of the steel substrate, over a depth of at least 5 μm, the cracks each having a width lower than 2 μm in a direction parallel to the surface of the steel substrate.

6. The hot-stamped coated steel part according to claim 1, wherein the lineic density of cracks is determined as a ratio between a total number of cracks observed in several cross-sections of the undeformed portion with a bright field optical microscope, over a total length of observation of at least 5 mm in a direction parallel to a surface of the steel substrate, and the total length of observation.

7. The hot-stamped coated steel part according to claim 1, wherein the hot-stamped coated steel part is a monolithic part, or a hot-stamped welded part consisting of at least two hot-stamped coated sub-parts and at least one hot-stamped weld joining together the hot-stamped coated sub-parts.

8. The hot-stamped coated steel part according to claim 7, wherein the hot-stamped coated steel part or each hot-stamped coated sub-part has a structure consisting of, by volume, at least 60% martensite, at most 20% bainite, at most 5% ferrite and at most 15% austenite.

9. The hot-stamped coated steel part according to claim 7, wherein the steel in the hot-stamped coated steel part or in each hot-stamped coated sub-part has a chemical composition comprising, by weight %:

0.062%≤C≤0.4%

0.4%≤Mn≤3.9%

0.10%≤Si≤1.5%

0.005%≤Al≤1.0%

0.001%≤Cr≤2.0%

0.001%≤Ti≤0.2%

0.0002%≤B≤0.010%

Ni≤2%

Nb≤0.1%

Mo≤0.65%

W≤0.30%

N≤0.010%

0.0001%≤S≤0.05%

0.0001%≤P≤0.1%

Ca≤0.005%, and a remainder being Fe and unavoidable impurities resulting from elaboration.

10. The hot-stamped coated steel part according to claim 9, wherein the steel in the hot-stamped coated steel part or in at least one hot-stamped coated sub-part has a chemical composition comprising, by weight %:

0.062%≤C≤0.095%

1.4%≤Mn≤1.9%

0.2%≤Si≤0.5%

0.020%≤Al≤0.070%

0.02%≤Cr≤0.1%

0.0035%≤Ti≤0.072%

0.0002%≤B≤0.004%

0.04% ≤ Nb ≤ 0.06% with 0.044% ≤ (Nb+Ti) ≤ 0.09%

0.001% ≤ N ≤ 0.009%

0.0005% ≤ S ≤ 0.003%

0.0001% ≤ P ≤ 0.020%

Ca ≤ 0.005%, and a remainder being Fe and unavoidable impurities resulting from elaboration.

11. The hot-stamped coated steel part according to claim 9, wherein the steel in the hot-stamped coated steel part or in at least one hot-stamped coated sub-part has a chemical composition comprising, by weight %:

0.15% ≤ C ≤ 0.30%

0.5% ≤ Mn ≤ 3.0%

0.10% ≤ Si ≤ 0.50%

0.005% ≤ Al ≤ 0.1%

0.01% ≤ Cr ≤ 1.0%

0.001% ≤ Ti ≤ 0.2%

0.0002% ≤ B ≤ 0.010%

0.0005% ≤ N ≤ 0.010%

0.0001% ≤ S ≤ 0.05%

0.0001% ≤ P ≤ 0.1%

Ca ≤ 0.005%, and a remainder being Fe and unavoidable impurities resulting from elaboration.

12. The hot-stamped coated steel part according to claim 9, wherein the steel in the hot-stamped coated steel part or in at least one hot-stamped coated sub-part has a chemical composition comprising, by weight %:

0.3% ≤ C ≤ 0.4%

0.5% ≤ Mn ≤ 1.0%

0.40% ≤ Si ≤ 0.80%

0.01% ≤ Al ≤ 0.1%

0.1% ≤ Cr ≤ 1.0%

0.008% ≤ Ti ≤ 0.03%

0.0005% ≤ B ≤ 0.003%

Ni ≤ 0.5%

0.01% ≤ Nb ≤ 0.1%

0.1% ≤ Mo ≤ 0.5%

N ≤ 0.005%

0.0001% ≤ S ≤ 0.004%

0.0001% ≤ P ≤ 0.02%

Ca ≤ 0.0010%, and a remainder being Fe and unavoidable impurities resulting from elaboration.

* * * * *